US 8,509,514 B2

(12) United States Patent
Chen

(10) Patent No.: US 8,509,514 B2
(45) Date of Patent: Aug. 13, 2013

(54) METHOD FOR PRIOR IMAGE CONSTRAINED IMAGE RECONSTRUCTION

(75) Inventor: Guang-Hong Chen, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 0 days.

(21) Appl. No.: 13/585,207

(22) Filed: Aug. 14, 2012

(65) Prior Publication Data

US 2012/0314927 A1 Dec. 13, 2012

Related U.S. Application Data

(63) Continuation of application No. 12/248,590, filed on Oct. 9, 2008, now Pat. No. 8,374,413.

(60) Provisional application No. 61/015,559, filed on Dec. 20, 2007, provisional application No. 61/020,847, filed on Jan. 14, 2008.

(51) Int. Cl.
    G06T 5/50 (2006.01)
    G06T 11/60 (2006.01)

(52) U.S. Cl.
    USPC .......................................... 382/131; 378/901

(58) Field of Classification Search
    USPC .............. 382/128, 131, 132, 232, 248, 325; 378/4–20, 62, 98, 98.8, 98.12, 210, 901
    See application file for complete search history.

(56) References Cited

U.S. PATENT DOCUMENTS

| 6,841,998 B1 | 1/2005 | Griswold |
| 7,289,049 B1 | 10/2007 | Fudge et al. |
| 7,330,027 B2 | 2/2008 | Kozerke et al. |
| 7,358,730 B2 | 4/2008 | Mistretta et al. |
| 7,408,347 B2 | 8/2008 | Mistretta et al. |
| 7,519,412 B2 | 4/2009 | Mistretta |
| 7,545,901 B2 | 6/2009 | Mistretta |
| 7,558,414 B2 | 7/2009 | Griswold |
| 7,647,088 B2 | 1/2010 | Mistretta et al. |

(Continued)

FOREIGN PATENT DOCUMENTS

WO   WO 2007095312 A2 * 8/2007

OTHER PUBLICATIONS

Michael Lustig, Student Member, IEEE; Compressed Sensing MRI; 18 pages; 2007.

(Continued)

Primary Examiner — Anastasia Midkiff
(74) Attorney, Agent, or Firm — Quarles & Brady, LLP

(57) ABSTRACT

A method for reconstructing a high quality image from undersampled image data is provided. The image reconstruction method is applicable to a number of different imaging modalities. Specifically, the present invention provides an image reconstruction method that incorporates an appropriate prior image into the image reconstruction process. Thus, one aspect of the present invention is to provide an image reconstruction method that requires less number of data samples to reconstruct an accurate reconstruction of a desired image than previous methods, such as, compressed sensing. Another aspect of the invention is to provide an image reconstruction method that imparts the signal-to-noise ratio of a prior image to the desired image being reconstructed. Another aspect of the invention is to provide an image reconstruction method that, when practiced in the field of x-ray imaging, allows for exposing a subject to substantially less radiation dose than is required in conventional x-ray imaging techniques.

24 Claims, 14 Drawing Sheets

(56) References Cited

U.S. PATENT DOCUMENTS

| | | |
|---|---|---|
| 2006/0029279 A1 | 2/2006 | Donoho |
| 2007/0010731 A1 | 1/2007 | Mistretta |
| 2007/0038073 A1 | 2/2007 | Mistretta |
| 2007/0106149 A1 | 5/2007 | Mistretta |
| 2007/0156044 A1 | 7/2007 | Mistretta et al. |
| 2007/0167707 A1 | 7/2007 | Mistretta et al. |
| 2007/0167728 A1 | 7/2007 | Mistretta et al. |
| 2007/0167729 A1 | 7/2007 | Mistretta et al. |
| 2008/0199063 A1 | 8/2008 | O'Halloran et al. |
| 2008/0219535 A1 | 9/2008 | Mistretta et al. |
| 2009/0076369 A1 | 3/2009 | Mistretta |
| 2009/0129651 A1 | 5/2009 | Zagzebski et al. |
| 2011/0044546 A1* | 2/2011 | Pan et al. ............... 382/195 |

OTHER PUBLICATIONS

Emmanuel J Cades et al; Robust Uncertainty Principles: Exact Signal Reconstruction From Highly Incomplete Frequency Information; IEEE Transactions on Information Theory, vol. 22, No. 2, Feb. 2006; 489-509.

David L Donoho, member IEEE; Compressed Sensing; IEEE Transactions on Information Theory, vol. 52, No. 4, Apr. 2006; 1289-1306.

Jiayu Song et al; Sparseness Prior Based Iterative Image Reconstruction for Retrospectively Gated Cardiac Micro-CT; Med. Phys. 34(11), Nov. 2007; pp. 4476-4483.

M. Lustig, et al., "Sparse MRI: The application of compressed sensing for rapid MR imaging" Magnetic Resonance in Medicine 58(6):1182-1195 (2007).

Fessler, et al., "Iterative Image Reconstruction in MRI With Separate Magnitude and Phase Regularization," IEEE International Symposium on Biomedical Imaging: Nano to Macro, 2004; 1:209-212.

Lustig, et al., "Rapid MR Imaging with 'Compressed Sensing' and Randomly Under-Sampled 3DFT Trajectories", Proc. Intl. Soc. Mag. Reson. Med. 14 (2006), p. 695.

Mistretta, et al., "Highly Constrained Backprojection for Time-Resolved MRI", Magn Reson Med, 2006, 55(1):30-40.

Donoho, "Compressed Sensing", Sep. 14, 2004, pp. 1-34.

Schmidt, "Least Squares Optimization with L1-Norm Regularization", Dec. 2005, pp. 1-12.

O'Halloran, et al., "Iterative Projection Reconstruction of Time-Resolved Images Using Highly-Constrained Back-Projection (HYPR)", Magn Reson Med, 2008, 59:132-139 (published online Dec. 3, 2007).

\* cited by examiner

METHOD FOR PRIOR IMAGE CONSTRAINED IMAGE RECONSTRUCTION

CROSS-REFERENCE TO RELATED APPLICATIONS

This application is a continuation of U.S. patent application Ser. No. 12/248,590, filed Oct. 9, 2009, now pending, which claims the benefit of U.S. Provisional Patent Application Ser. No. 61/015,559, filed Dec. 20, 2007, and U.S. Provisional Patent Application Ser. No. 61/020,847, filed Jan. 14, 2008, all of which are hereby incorporated by reference in their entirety.

STATEMENT REGARDING FEDERALLY SPONSORED RESEARCH

This invention was made with government support under EB005712 and EB007021 awarded by the National Institutes of Health. The government has certain rights in the invention.

BACKGROUND OF THE INVENTION

The field of the invention is medical imaging and particularly, methods for reconstructing images from acquired image data.

In a computed tomography system, an x-ray source projects a fan-shaped beam which is collimated to lie within an x-y plane of a Cartesian coordinate system, termed the "image plane." The x-ray beam passes through the object being imaged, such as a medical patient, and impinges upon an array of radiation detectors. The intensity of the transmitted radiation is dependent upon the attenuation of the x-ray beam by the object and each detector produces a separate electrical signal that is a measurement of the beam attenuation. The attenuation measurements from all the detectors are acquired separately to produce what is called the "transmission profile," or "attenuation profile" or "projection."

The source and detector array in a conventional CT system are rotated on a gantry within the imaging plane and around the object so that the angle at which the x-ray beam intersects the object constantly changes. The transmission profile from the detector array at a given angle is referred to as a "view" and a "scan" of the object comprises a set of views made at different angular orientations during one revolution of the x-ray source and detector. In a 2D scan, data is processed to construct an image that corresponds to a two dimensional slice taken through the object. The prevailing method for reconstructing an image from 2D data is referred to in the art as the filtered backprojection technique. This image reconstruction process converts the attenuation measurements acquired during a scan into integers called "CT numbers" or "Hounsfield units", which are used to control the brightness of a corresponding pixel on a display.

The filtered backprojection image reconstruction method is the most common technique used to reconstruct CT images from acquired transmission profiles. As shown in FIG. 1 each acquired x-ray transmission profile 100 is backprojected onto the field of view (FOV) 102 by projecting each ray sum 104 in the profile 100 through the FOV 102 along the same ray path that produced the ray sum 104 as indicated by arrows 106. In projecting each ray sum 104 in the FOV 102 we have no a priori knowledge of the subject and the assumption is made that the x-ray attenuation in the FOV 102 is homogeneous and that the ray sum should be distributed equally in each pixel through which the ray path passes. For example, a ray path 108 is illustrated in FIG. 1 for a single ray sum 104 in one transmission profile 100 and it passes through N pixels in the FOV 102. The attenuation value, P, of this ray sum 104 is divided up equally between these N pixels:

$$\mu_n = \frac{(P \times 1)}{N}$$

where $\mu_n$ is the attenuation value distributed to the $n^{th}$ pixel in a ray path having N pixels.

Clearly, the assumption that attenuation in the FOV 102 is homogeneous is not correct. However, as is well known in the art, if certain corrections are made to each transmission profile 100 and a sufficient number of profiles are acquired at a corresponding number of projection angles, the errors caused by this faulty assumption are minimized and image artifacts are suppressed. In a typical filtered backprojection method of image reconstruction, anywhere from 400 to 1000 views are typically required to adequately suppress image artifacts in a 2D CT image.

Another issue with x-ray CT is the x-ray dose to which the subject is exposed during the scan. To obtain a higher resolution and artifact free image it is necessary to obtain many views at a high enough x-ray beam intensity to reconstruct an image at the desired signal-to-noise ratio (SNR). The dose level may be reduced by decreasing the beam strength or reducing the number of acquired views, but either step also reduces the SNR of the reconstructed image.

Recent studies have underscored the importance of reducing the radiation dose to medical patients undergoing routine CT exams. For example, as reported by J. M. Peloquin, et al., in "Diagnostic Ionizing Radiation Exposure in a Population-Based Cohort of Patients with Inflammatory Bowel Disease," *American Journal of Gastroenterology* 2008; 103:2015-2022, it was found that the radiation dose to patients with inflammatory bowel disease (IBD) was equivalent to, or greater than, the average radiation dose to the general population from naturally occurring sources, which is around 3.0 millisievert (mSv). Because as many as 1.4 million people in the United States and 2.2 million people in Europe are estimated to suffer from IBD, the development of imaging methods that reduce the radiation dose imparted to patients with IBD, while maintaining image quality, is important. In another recent study reported by J. E. Winslow, et al., in "Quantitative Assessment of Diagnostic Radiation Doses in Adult Blunt Trauma Patients," *Annals of Emergency Medicine* 2008; 52:93-97, it was found that many trauma patients admitted to a Level I trauma center were exposed to clinically relevant levels of radiation exposure during their first 24 hours of care. This is because many trauma centers employ numerous x-ray imaging-based examinations when assessing trauma patients. Thus, it would be beneficial to develop a means for reducing the radiation dose imparted to trauma patients without affecting the quality of images obtained in the clinical setting.

Magnetic resonance imaging (MRI) uses the nuclear magnetic resonance (NMR) phenomenon to produce images. When a substance such as human tissue is subjected to a uniform magnetic field (polarizing field $B_0$), the individual magnetic moments of the spins in the tissue attempt to align with this polarizing field, but precess about it in random order at their characteristic Larmor frequency. If the substance, or tissue, is subjected to a magnetic field (excitation field $B_1$) which is in the x-y plane and which is near the Larmor frequency, the net aligned moment, $M_Z$, may be rotated, or "tipped", into the x-y plane to produce a net transverse magnetic moment $M_{xy}$. A signal is emitted by the excited spins, and after the excitation signal $B_1$ is terminated, this signal may be received and processed to form an image.

When utilizing these signals to produce images, magnetic field gradients ($G_x$, $G_y$, and $G_z$) are employed. Typically, the region to be imaged is scanned by a sequence of measurement cycles in which these gradients vary according to the particular localization method being used. Each measurement is referred to in the art as a "view" and the number of views determines the quality of the image. The resulting set of received NMR signals, or views, or k-space samples, are digitized and processed to reconstruct the image using one of many well known reconstruction techniques. The total scan time is determined in part by the length of each measurement cycle, or "pulse sequence", and in part by the number of measurement cycles, or views, that are acquired for an image. There are many clinical applications where total scan time for an image of prescribed resolution and SNR is a premium, and as a result, many improvements have been made with this objective in mind.

Projection reconstruction methods have been known since the inception of magnetic resonance imaging and this method is again being used as disclosed in U.S. Pat. No. 6,487,435. Rather than sampling k-space in a rectilinear, or Cartesian, scan pattern as is done in Fourier imaging and shown in FIG. 2A, projection reconstruction methods sample k-space with a series of views that sample radial lines extending outward from the center of k-space as shown in FIG. 2B. The number of views needed to sample k-space determines the length of the scan and if an insufficient number of views are acquired, streak artifacts are produced in the reconstructed image. The technique disclosed in U.S. Pat. No. 6,487,435 reduces such streaking by acquiring successive undersampled images with interleaved views and sharing peripheral k-space data between successive image frames.

Two example methods used to reconstruct images from an acquired set of projection views are described, for example, in U.S. Pat. No. 6,710,686. In MRI the most common method is to regrid the k-space samples from their locations on the radial sampling trajectories to a Cartesian grid. The image is then reconstructed by performing a 2D or 3D Fourier transformation of the regridded k-space samples. The second method for reconstructing an MR image is to transform the radial k-space projection views to Radon space by first Fourier transforming each projection view. An image is reconstructed from these signal projections by filtering and back-projecting them into the field of view (FOV). As is well known in the art, if the acquired signal projections are insufficient in number to satisfy the Nyquist sampling theorem, streak artifacts are produced in the reconstructed image.

Depending on the technique used, many MR scans currently used to produce medical images require many minutes to acquire the necessary data. The reduction of this scan time is an important consideration, since reduced scan time increases patient throughout, improves patient comfort, and improves image quality by reducing motion artifacts. Many different strategies have been developed to shorten the scan time.

One such strategy is referred to generally as "parallel imaging". Parallel imaging techniques use spatial information from arrays of RF receiver coils to substitute for the encoding that would otherwise have to be obtained in a sequential fashion using RF pulses and field gradients (such as phase and frequency encoding). Each of the spatially independent receiver coils of the array carries certain spatial information and has a different sensitivity profile. This information is utilized in order to achieve a complete location encoding of the received MR signals by a combination of the simultaneously acquired data received from the separate coils. Specifically, parallel imaging techniques undersample k-space by reducing the number of acquired phase-encoded k-space sampling lines while keeping the maximal extent covered in k-space fixed. The combination of the separate MR signals produced by the separate receiver coils enables a reduction of the acquisition time required for an image (in comparison to conventional k-space data acquisition) by a factor that in the most favorable case equals the number of the receiver coils. Thus the use of multiple receiver coils acts to multiply imaging speed, without increasing gradient switching rates or RF power.

Two categories of such parallel imaging techniques that have been developed and applied to in vivo imaging are SENSE (SENSitivity Encoding) and SMASH (SiMultaneous Acquisition of Spatial Harmonics). With SENSE, the undersampled k-space data is first Fourier transformed to produce an aliased image from each coil, and then the aliased image signals are unfolded by a linear transformation of the superimposed pixel values. With SMASH, the omitted k-space lines are filled in or reconstructed prior to Fourier transformation, by constructing a weighted combination of neighboring lines acquired by the different receiver coils. SMASH requires that the spatial sensitivity of the coils be determined, and one way to do so is by "autocalibration" that entails the use of variable density k-space sampling.

The data acquisition methods are significantly different in the above exemplary imaging modalities. Namely, k-space is sampled to measure Fourier coefficients in MR data acquisitions while line integrals are measured in x-ray CT data acquisitions. Despite this, the challenge in image reconstruction for both modalities is common: reconstructing a high quality image from an undersampled data set.

According to standard image reconstruction theories, in order to reconstruct an image without aliasing artifacts, the sampling rate employed to acquire image data must satisfy the so-called Nyquist criterion, which is set forth in the Nyquist-Shannon sampling theorem. Moreover, in standard image reconstruction theories, no specific prior information about the image is needed. On the other hand, when some prior information about the desired or target image is available and appropriately incorporated into the image reconstruction procedure, an image can be accurately reconstructed even if the Nyquist criterion is violated. For example, if one knows a desired, target image is circularly symmetric and spatially uniform, only one view of parallel-beam projections (i.e., one projection view) is needed to accurately reconstruct the linear attenuation coefficient of the object. As another example, if one knows that a desired, target image consists of only a single point, then only two orthogonal projections that intersect at said point are needed to accurately reconstruct the image point. Thus, if prior information is known about the desired target image, such as if the desired target image is a set of sparsely distributed points, it can be reconstructed from a set of data that was acquired in a manner that does not satisfy the Nyquist criterion. Put more generally, knowledge about the sparsity of the desired target image can be employed to relax the Nyquist criterion; however, it is a highly nontrivial task to generalize these arguments to formulate a rigorous image reconstruction theory.

The Nyquist criterion serves as one of the paramount foundations of the field of information science. However, it also plays a pivotal role in modern medical imaging modalities such as magnetic resonance imaging (MRI) and x-ray computed tomography (CT). When the number of data samples acquired by an imaging system is less than the requirement imposed by the Nyquist criterion, artifacts appear in the reconstructed images. In general, such image artifacts include aliasing and streaking artifacts. In practice, the Nyquist criterion is often violated, whether intentionally or through unavoidable circumstances. For example, in order to shorten the data acquisition time in a time-resolved MR angiography study, undersampled projection reconstruction, or radial, acquisition methods are often intentionally introduced.

In contrast, undersampling is inevitable in four-dimensional cone beam CT (4D CBCT), such as when utilized in image-guided radiation therapy (IGRT). For example, in the case of IGRT, cone beam projection data are acquired over 10-15 respiratory cycles during a 60 second gantry rotation time. The acquired data is then retrospectively gated into 8-10 phases by synchronizing the respiratory signals with the data acquisition. After the respiratory gating, less than 100 cone beam projections are typically available to reconstruct images for each respiratory phase. Consequently, streaking artifacts are rampant in the reconstructed images for each respiratory phase. These undersampling artifacts pose a major challenge in 4D CBCT and limit the use of 4D CBCT in clinical practice.

Recently, a new image reconstruction method called highly constrained backprojection (HYPR) has been developed. As described in co-pending U.S. patent application Ser. No. 11/482,372, HYPR provides a method in which quality images can be reconstructed from far fewer projection signal profiles when a priori knowledge of the signal information is used in the reconstruction process. For example, signal information in an angiographic study may be known to include structures such as blood vessels. That being the case, when a backprojection path passes through these structures a more accurate distribution of a signal sample in each pixel can be achieved by weighting the distribution as a function of the known signal information at that pixel location. In HYPR, for a backprojection path having N pixels the highly constrained backprojection may be expressed as follows:

$$S_n = \frac{(P \times C_n)}{\sum_{n=1}^{N} C_n},$$

where $S_n$ is the backprojected signal magnitude at a pixel n in an image frame being reconstructed, P is the signal sample value in the projection profile being backprojected, and $C_n$ is the signal value of an a priori composite image at the $n^{th}$ pixel along the backprojection path. The composite image is reconstructed from data acquired during the scan, and may include that used to reconstruct the given image frame as well as other acquired image data that depicts the structures in the field of view. The numerator in the equation above, $(P \times C_n)$, weights each pixel using the corresponding signal value in the composite image and the denominator, $$\sum_{n=1}^{N} C_n,$$

normalizes the value so that all backprojected signal samples reflect the projection sums for the image frame and are not multiplied by the sum of the composite image.

Also recently, a new mathematical framework for image reconstruction termed "compressed sensing" (CS) was formulated. In compressed sensing, only a small set of linear projections of a sparse image are required to reconstruct a quality image. The theory of CS is described in E. Candès, J. Romberg, and T. Tao, "Robust uncertainty principles: Exact signal reconstruction from highly incomplete frequency information," *IEEE Transactions on Information Theory* 2006; 52:489-509, and D. Donoho, "Compressed sensing," *IEEE Transactions on Information Theory* 2006; 52:1289-1306, and is disclosed, for example, in U.S. patent application Ser. No. 11/199,675.

Although the mathematical framework of CS is elegant, the applicability of the reconstruction method to the field of medical imaging critically relies on the medical images being sparse. Unfortunately, a medical image is often not sparse in the standard pixel representation. Despite this, mathemtical transforms can be applied to a single image in order to sparsify the image. Such transforms are thus referred to as "sparsifying transforms". More specifically, given a sparsifying transform, $\Psi$, CS image reconstruction is implemented by minimizing the following objective function:

$$\|\Psi I\|_1,$$

such that, $$AI=Y.$$

In the above objective function, I is a vector that represents the desired image, Y is a vector that represents the data acquired by the imaging system, A is a system matrix that describes the measurements, and $$\|x\|_1 = \sum_{i=1}^{N} |x_i|,$$

is the so-called $L_1$-norm of an N-dimensional vector, x. Namely, the CS image reconstruction determines an image that minimizes the $L_1$-norm of the sparsified image among all images that are consistent with the physical measurements, AX=Y.

The basic ideas in the compressed sensing image reconstruction theory can be summarized as follows. Instead of directly reconstructing a desired image in pixel representation, a sparsified version of the desired image is reconstructed. In the sparsified image, substantially fewer image pixels have significant image values; thus, it is possible to reconstruct the sparsified image from an undersampled data set. After the sparsified desired image is reconstructed, an "inverse sparsifying transform" is used to transform the sparsified image back to the desired image. In practice, there is no need to have an explicit form for the "inverse" sparsifying transform. In fact, only the sparsifying transform is needed in image reconstruction.

SUMMARY OF THE INVENTION

The present invention provides an image reconstruction method applicable to a number of different imaging modalities including x-ray computed tomography (CT), x-ray C-arm imaging, and magnetic resonance imaging (MRI). More specifically, the present invention provides an image reconstruction method that combines the merits of accurate reconstruction with a gain in signal-to-noise ratio (SNR) by incorporating an appropriate prior image of the subject into the image reconstruction process. In addition to the increased SNR, for a given desired image and a given number of projections, the method of the present invention provides accurate image reconstruction where previous image reconstruction methods, such as compressed sensing (CS) fail.

The method of the present invention acquires undersampled image data with an imaging system, from which an estimate of a desired image of the subject is produced. In the alternative, the prior image of the subject is used as the estimate of the desired image. Using the prior image and the desired image, a sparsified image is produced. This sparsified image, along with the estimate of the desired image, is further sparsified through the application of an appropriate sparsifying transform. From this, an objective function is produced and iteratively minimized to produce a high quality version of the desired image.

One aspect of the invention is to provide an image reconstruction method that requires less number of data samples to reconstruct an accurate reconstruction of a desired image than previous methods, such as, in particular, compressed sensing.

Another aspect of the invention is to provide an image reconstruction method that imparts the signal-to-noise ratio (SNR) of a quality prior image to the desired image being reconstructed. The SNR of the reconstructed desired image is dominated by the SNR from the prior image when said prior image is appropriately utilized. This aspect of the invention circumvents the conventional SNR bottleneck resulting from utilizing a highly undersampled data set for image reconstruction.

Yet another aspect of the invention is to provide an image reconstruction method that iteratively converges to a desired image in a substantially fewer number of iterations. This aspect of the invention allows for a decrease in computational burden in comparison with other methods of image reconstruction. In particular, the present invention requires substantially fewer iterations that, for example, compressed sensing.

Yet another aspect of the invention is to provide an image reconstruction method that, when practiced in the field of x-ray imaging, allows for exposing a subject to substantially less radiation dose than is required in conventional x-ray imaging techniques. This aspect of the present invention allows for an increase in patient safety, especially in those patients who routinely undergo x-ray imaging studies throughout their continuum of care.

The foregoing and other aspects and advantages of the invention will appear from the following description. In the description, reference is made to the accompanying drawings which form a part hereof, and in which there is shown by way of illustration a preferred embodiment of the invention. Such an embodiment does not necessarily represent the full scope of the invention, however, and reference is made therefore to the claims and herein for interpreting the scope of the invention.

DETAILED DESCRIPTION OF THE INVENTION

Figure 1:
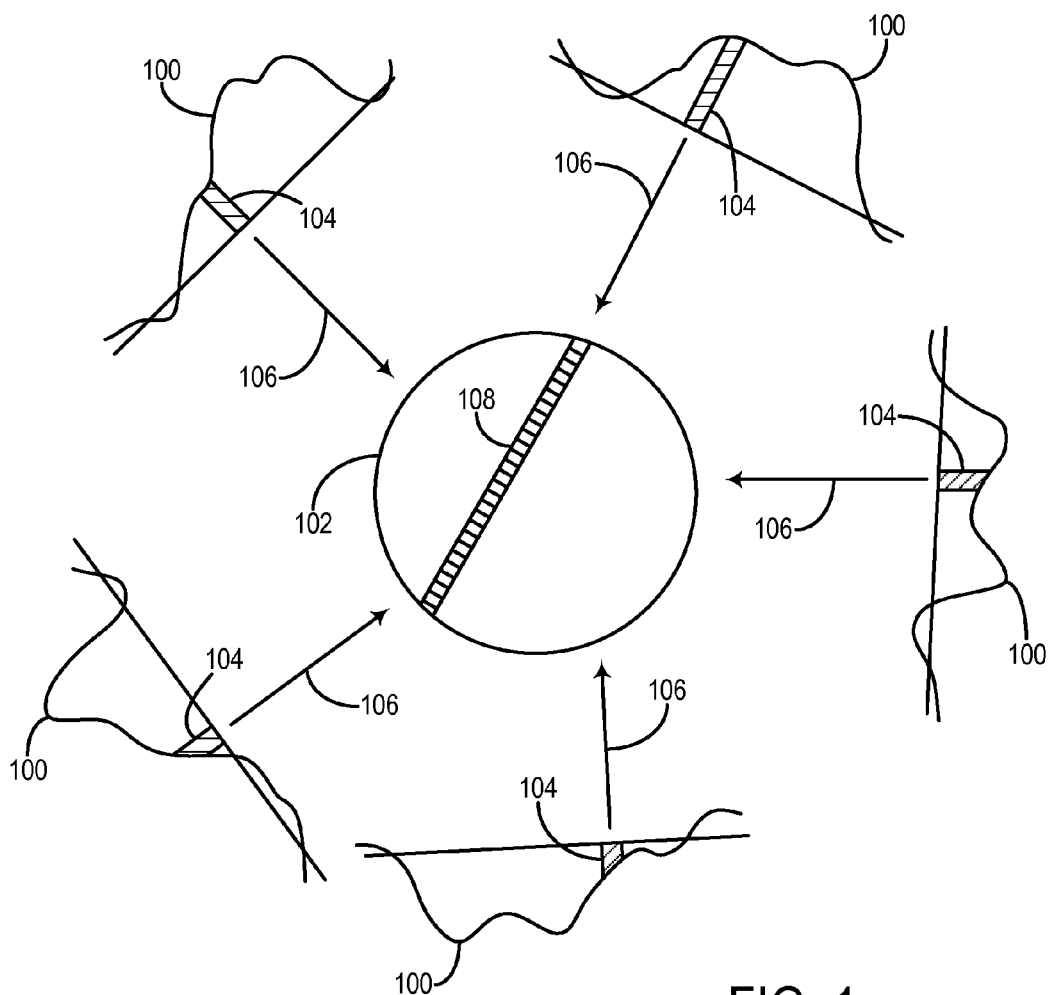
FIG. 1 is a pictorial representation of a conventional back-projection step in an image reconstruction process.
Figure 2A:
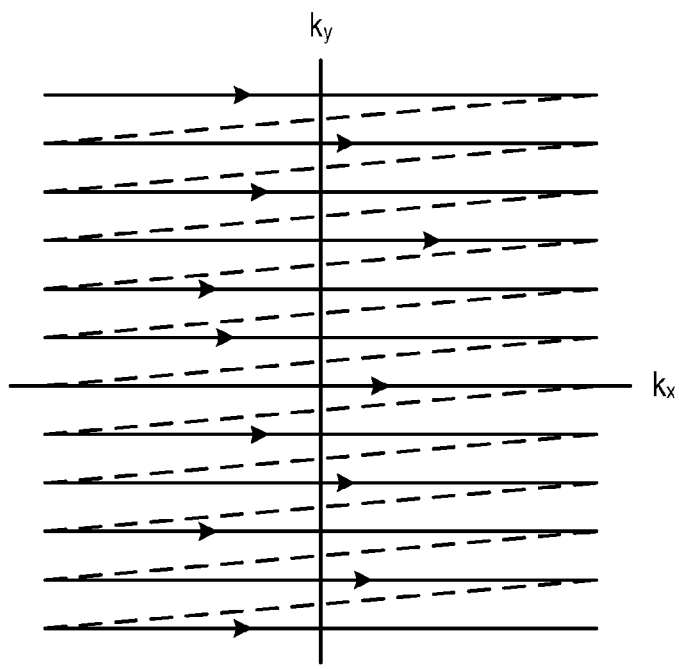
FIG. 2A is a graphic illustration of the manner in which k-space is sampled during a typical Fourier, or spin-warp, image acquisition using an MRI system.
Figure 2B:
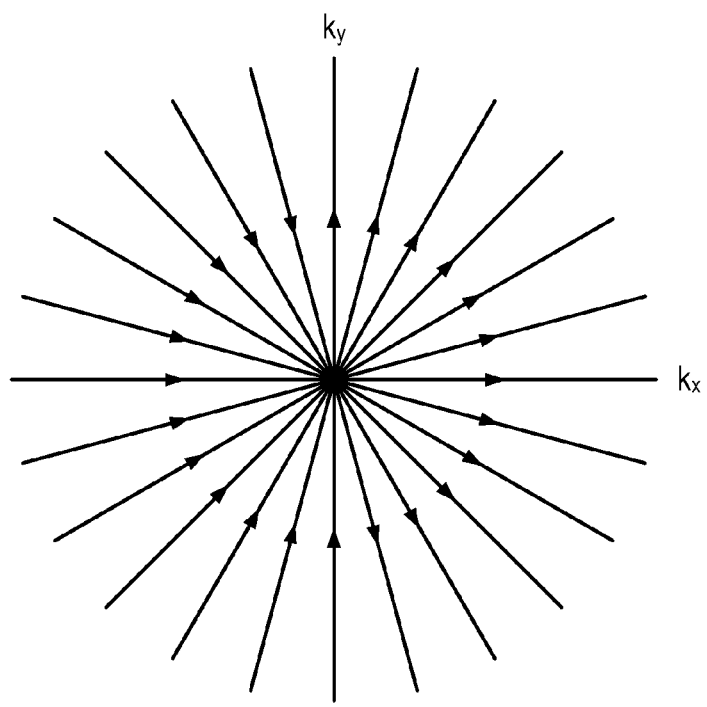
FIG. 2B is a graphic illustration of the manner in which k-space is sampled during a typical projection reconstruction image acquisition using an MRI system.

Generally speaking, the method of reconstructing an image from a set of data includes a series of numerical steps to estimate a desired image, I, from the measured data samples, Y. More specifically, the image reconstruction should fulfill the following consistency condition:

$$AI=Y, \quad (1)$$

where A is a system matrix. In general, the system matrix, A, can be viewed as a forward projection operator that relates the desired image, I, to the acquired data samples, Y. When dealing with computed tomography (CT) imaging, the system matrix can include a reprojection operation, while in magnetic resonance imaging (MRI), it can include a Fourier transform operation. The consistency condition of equation (1), put in other words, states that when an image is faithfully reconstructed, the forward operation should substantially mimic the actual data acquisition procedure in order to generate a correct estimate of the measured projection data.

Turning now to the method of the present invention, a method for reconstructing a quality desired image is provided. In general, a "prior image" is employed to constrain an iterative image reconstruction method, in which the principles of compressed sensing (CS) are utilized. For example, in addition to the sparsifying transforms commonly used in CS, an image is further sparsified by subtracting the prior image from the desired image. As a result, an image can be accurately reconstructed using a substantially fewer number of samples than required by CS methods.

More specifically, given a prior image, $I_P$, and a desired image to be reconstructed, I, the method of the present invention for image reconstruction is implemented by minimizing the following objective function:

$$\alpha\|\Psi_1(I-I_P)\|_1+(1-\alpha)\|\Psi_2 I\|_1, \quad (2)$$

where $\Psi_1$ and $\Psi_2$ are sparsifying transforms, $\|\ldots\|_1$ is an $L_1$-norm operation, and $\alpha$ is a regularization parameter that is utilized to control the relative weight of the two terms in the objective function of equation (2). As noted above, $$\|x\|_1 = \sum_{i=1}^{N} |x_i|,$$

indicates the $L_1$-norm of an N-dimensional vector, x. More generally, a deviation from the true $L_1$-norm is possible while still maintaining adequate image quality in the desired image. For example, the objective function of equation (2) can be generalized as:

$$\alpha\|\Psi_1(I-I_P)\|_p + (1-\alpha)\|\Psi_2 I\|_p,$$

where $\|\ldots\|_p$ is an $L_p$-norm operation having the form:

$$\|x\|_p = \left(\sum_{i=1}^{N} |x_i|^p\right)^{1/p}.$$

As noted above, preferably p=1.0; however, in the alternative, different values of p are possible. It should be appreciated by those skilled in the art that the further the value of p deviates from p=1.0, generally, the more degradation will be evident in the reconstructed desired image.

The sparsifying transforms in equation (2), $\Psi_1$ and $\Psi_2$, are, in general, different; however, in the alternative, $\Psi_1$ and $\Psi_2$ may be the same sparsifying transform. Exemplary sparsifying transforms include a wavelet transform, a first order finite difference, a second order finite difference, and a discrete gradient transform, such as, for example, a discrete gradient transform, $\nabla_{m,n}$, having the following form:

$$\nabla_{m,n} I(m,n) = \sqrt{[I(m+1,n)-I(m,n)]^2 + [I(m,n+1)-I(m,n)]^2},$$

where the indices m and n indicate the location of a pixel in an image, I. The image specified as $\nabla_{m,n}I(m,n)$ is commonly referred to as the "gradient image".

Both of the terms in the objective function of equation (2) are important. As a result of their importance, the selection of the regularization parameter, $\alpha$, is utilized to control the overall image reconstruction process. Therefore, the selection of the regularization parameter, $\alpha$, will depend on the choice of the prior image, $I_P$, and also the clinical application at hand. For example, the second term in the objective function of equation (2), $(1-\alpha)\|\Psi_2 I\|_1$, mitigates streaking artifacts that are potentially inherited from the prior image, $I_P$. For further example, selecting a regularization parameter of $\alpha \approx 0.3$-$0.7$ is generally sufficient for cardiac imaging applications.

To better incorporate the consistency condition of equation (1) into the overall image reconstruction, the method of Lagrange multipliers is utilized. In such a manner, the consistency condition is employed to add a further constraint on the minimization of the objective function set forth in equation (2). A new objective function is thus produced, which has the form:

$$\alpha\|\Psi_1(I-I_P)\|_1 + (1-\alpha)\|\Psi_2 I\|_1 + \lambda\|X\|_2^2, \quad (3)$$

where $\lambda$ is the Lagrange multiplier, X is a difference matrix, and $\|\ldots\|_2^2$ is a squared $L_2$-norm operation, which, for an N-dimensional vector, x, has the form:

$$\|x\|_2^2 = \sum_{i=1}^{N} x_i^2.$$

The difference matrix in equation (3) accounts for the consistency condition of equation (1), and has the following form:

$$X = AI - Y.$$

The Lagrange multiplier, $\lambda$, is determined empirically for the particular imaging system employed when practicing the present invention. For example, the Lagrange multiplier, $\lambda$, is determined by a pre-determined tradeoff between the desired data consistency requirement and the similarity to the prior image, $I_P$. When a large Lagrange multiplier, $\lambda$, is selected, the reconstructed image has lower noise variance; however, this may be achieved as a loss of the high spatial resolution characteristic of the prior image. Similarly, when a smaller Lagrange multiplier, $\lambda$, is used, the high spatial resolution characteristic of the prior image is well preserved, but the noise variance can be high in the desired image. Such a situation affects the contrast-to-noise ratio achievable by the imaging system utilized.

The objective function presented in equation (3) can further be altered in order to account for noise of the imaging system. In such a manner, the following objective function is minimized:

$$\alpha\|\Psi_1(I-I_P)\|_1 + (1-\alpha)\|\Psi_2 I\|_1 + \lambda(X^T DX), \quad (4)$$

where $X^T$ is the transpose of the difference matrix, X, and D is a system noise matrix, which is a diagonal matrix having the following matrix elements:

$$D_{ij} = \begin{cases} \dfrac{1}{\sigma_n^2} & \text{if } i = j \\ 0 & \text{if } i \neq j, \end{cases}$$

where $\sigma_n^2$ is the noise variance, and is a parameter indicative of noise in the imaging system employed when practicing the present invention. For example, in an x-ray imaging system, the noise parameter, $\sigma_n^2$, is the noise variance associated with the $n^{th}$ x-ray detector. Alternatively, in an MR imaging system, the noise parameter, $\sigma_n^2$, is estimated noise variance in the $n^{th}$ receiver coil.

In the method of the present invention, the prior image, $I_P$, plays two roles. First, it serves as a seed image in the iterative reconstruction, which accelerates the overall image reconstruction method. In addition, the prior image, $I_P$, is employed to further sparsify the desired image, I, and, thus, serves as yet another sparsifying transform. A brief discussion of possible prior images, $I_P$, is provided below; however, it should be appreciated by those skilled in the art that prior images, $I_P$, other than those expressly described below can be employed depending on the clinical application. As referred to herein, a prior image, $I_P$, is an image of the subject that includes a priori information that is indicative of the desired image to be reconstructed.

One example of the prior image, $I_P$, corresponds to the fields of CT and MR angiography, in which data acquisitions are performed both before and after the passage of a contrast agent through a tissue of interest in a subject. Commonly, the image acquired before the administration of the contrast agent is referred to as a "mask image". This mask image can be utilized as the prior image in the present invention. The subtraction of this mask image from a desired image, e.g., in the objective function in equation (2), results in a significantly sparsified image. A subtraction such as this provides the simplest sparsifying transform in medical imaging; however, it is also one of the strongest sparsifying transforms.

Another example of a prior image, $I_P$, is to utilize the images from a previous imaging session. Using such a prior image, the mismatch in patient positioning between the two studies needs to be resolved. This can be done using standard image registration methods. For example, anatomical structures such as the spine and ribs can be utilized for rigid body registration. The image registration process will be performed in image space using achieved image data from a previous imaging session.

Yet another example of a prior image, $I_P$, is in the field of cardiac CT. Here, a calcium scoring scan is utilized as the prior image, $I_P$. In this case, an image registration step is often not necessary since the calcium scoring image can be obtained just prior to subsequent imaging of the subject and, thus, it is not necessary to move the subject between scans.

Prior images are also available when a patient undergoes a series of image studies over a period of time. For example, diagnostic CT scans are commonly performed for patients with cancer during the treatment planning stage. Subsequently, during treatment, a cone beam CT scan is performed in the treatment suite to verify the tumor position. Therefore, the treatment planning CT image can be used as the prior image when reconstructing the cone beam CT images.

Figure 3:
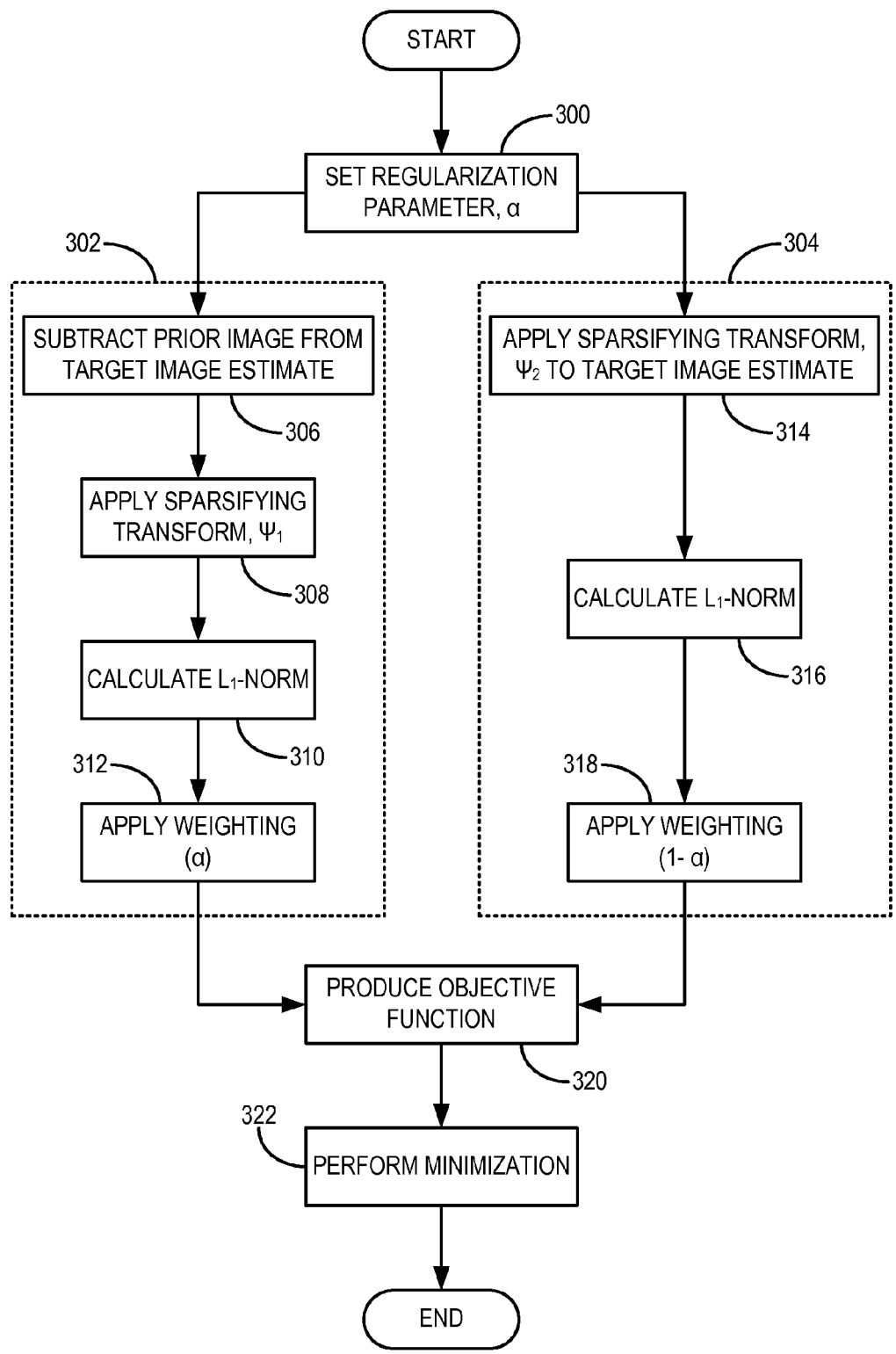
FIG. 3 is a flowchart an embodiment of the image reconstruction method of the present invention.

With reference now to FIG. 3, one implementation of the method of the present invention employs the objective function of equation (2), and begins by initializing the regularization parameter, $\alpha$, as indicated at step 300. The choice of the regularization parameter, $\alpha$, determines the trade-off between the sparsity of the desired image, and the influence of the prior image on the desired image. Accordingly, the value of the regularization parameter, $\alpha$, will vary depending on the clinical application at hand. For example, a value of $\alpha \approx 0.3$-$0.7$ is generally sufficient for cardiac imaging applications. Subsequently, the first and second terms in the objective function of equation (2) are initialized, as indicated in steps 302 and 304, respectively. The initialization of the first term, $\alpha \|\Psi_1(I-I_P)\|_1$, begins at step 306 where the prior image, $I_P$, is subtracted from an estimate of the desired image or "estimate image," to produce a "difference image". In general, the estimate image is a reasonable approximation of the intensity of the desired image. The particular choice of the prior image, $I_P$, and the estimate of the desired image, I, will depend on the imaging modality and the particular clinical application. Accordingly, different alternatives for these choices will be discussed in detail below. The difference image is subsequently sparsified by applying the sparsifying transform, $\Psi_1$, as indicated at step 308. As described above, the sparsifying transform, $\Psi_1$, can be any number of mathematical operations, including a wavelet transform, a first order finite difference, a second order finite difference, and a discrete gradient transform. The $L_1$-norm of this sparsified difference image is then calculated at step 310. The result of this process is then weighted by the regularization parameter, $\alpha$, as indicated at step 312.

The initialization of the second term in the objective function of equation (2), $(1-\alpha)\|\Psi_2 I\|_1$, begins at step 314 where the estimate of the desired image, I, is sparsified through the application of the sparsifying transform, $\Psi_2$. Subsequently, the $L_1$-norm of this sparsified desired image estimate is calculated at step 316. When the discrete gradient transform, $\nabla_{m,n}$, is selected as the sparsifying transform, $\Psi_2$, steps 314 and 316 can be viewed as calculating the total variation, TV, of the desired image estimate, which has the form:

$$TV(I) = \|\nabla I\|_1 = \Sigma |\nabla I|.$$

After the $L_1$-norm of the sparsified desired image estimate is calculated, the result is weighted by $(1-\alpha)$, as indicated at step 318. The objective function of equation (2) is subsequently produced in step 320 by adding the first and second terms together. This objective function is then minimized, as indicated at step 322, using, for example, a nonlinear conjugate gradient method. The minimization process proceeds until a stopping criterion is satisfied. The stopping criterion includes, for example, comparing the current estimate of the desired image with the estimate of the desired image from the previous iteration. Such a stopping criterion has the following form:

$$\sum_i \sum_j (I_{ij}^{(k+1)} - I_{ij}^{(k)})^2,$$

where, $I_{ij}^{(k+1)}$ is the value of the $(k+1)^{th}$ estimate of the desired image at the pixel location (i,j), and $I_{ij}^{(k)}$ is the value of the $k^{th}$ estimate of the desired image at the pixel location (i,j).

Figure 4:
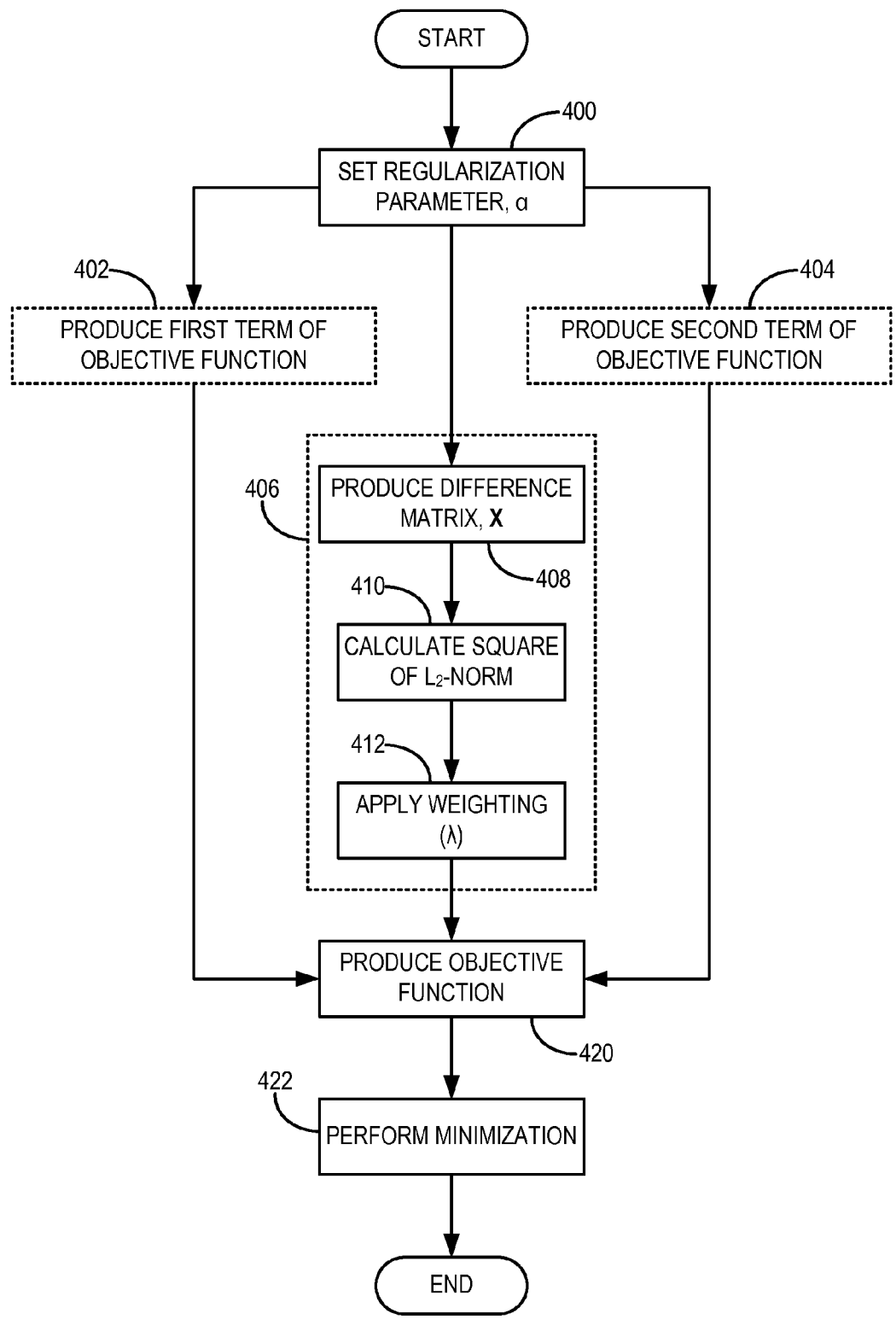
FIG. 4 is a flowchart of another embodiment of the image reconstruction method of the present invention.

With reference now to FIG. 4, another implementation of the method of the present invention employs the objective function of equation (3), and begins by initializing the regularization parameter, $\alpha$, as indicated at step 400. Subsequently, the first and second terms in the objective function of equation (3) are initialized, as indicated in steps 402 and 404, respectively. This process proceeds in the same manner as described above with reference to steps 302 and 304 in FIG. 3. Now, however, the consistency condition of equation (1) is incorporated into a third term, $\lambda \|X\|_2^2$, which is initialized at step 406. First, the difference matrix, X, is produced, as indicated at step 408. As described above in detail, the difference matrix, X, corresponds to the consistency condition of equation (1) and has the following form:

$$X = AI - Y.$$

Thus, the difference matrix is determined by applying the system matrix, A, to the estimate of the desired image, I, and subsequently subtracting the acquired image data, Y, that corresponds to the desired image. The square of the $L_2$-norm of the difference matrix, X, is calculated next at step 410. After the square of the $L_2$-norm of the difference matrix, X, has been produced, the Lagrange multiplier, $\lambda$, is determined and employed to weight the difference matrix, X, as indicated at step 412. As described above, the Lagrange multiplier is empirically determined by and the value selected by the user based on the clinical application at hand. The objective function of equation (3) is subsequently produced in step 420 by adding the first, second, and third terms together. This objective function is then minimized, as indicated at step 422, using, for example, a nonlinear conjugate gradient method. The minimization process proceeds until a stopping criterion is satisfied, as described above.

Figure 5:
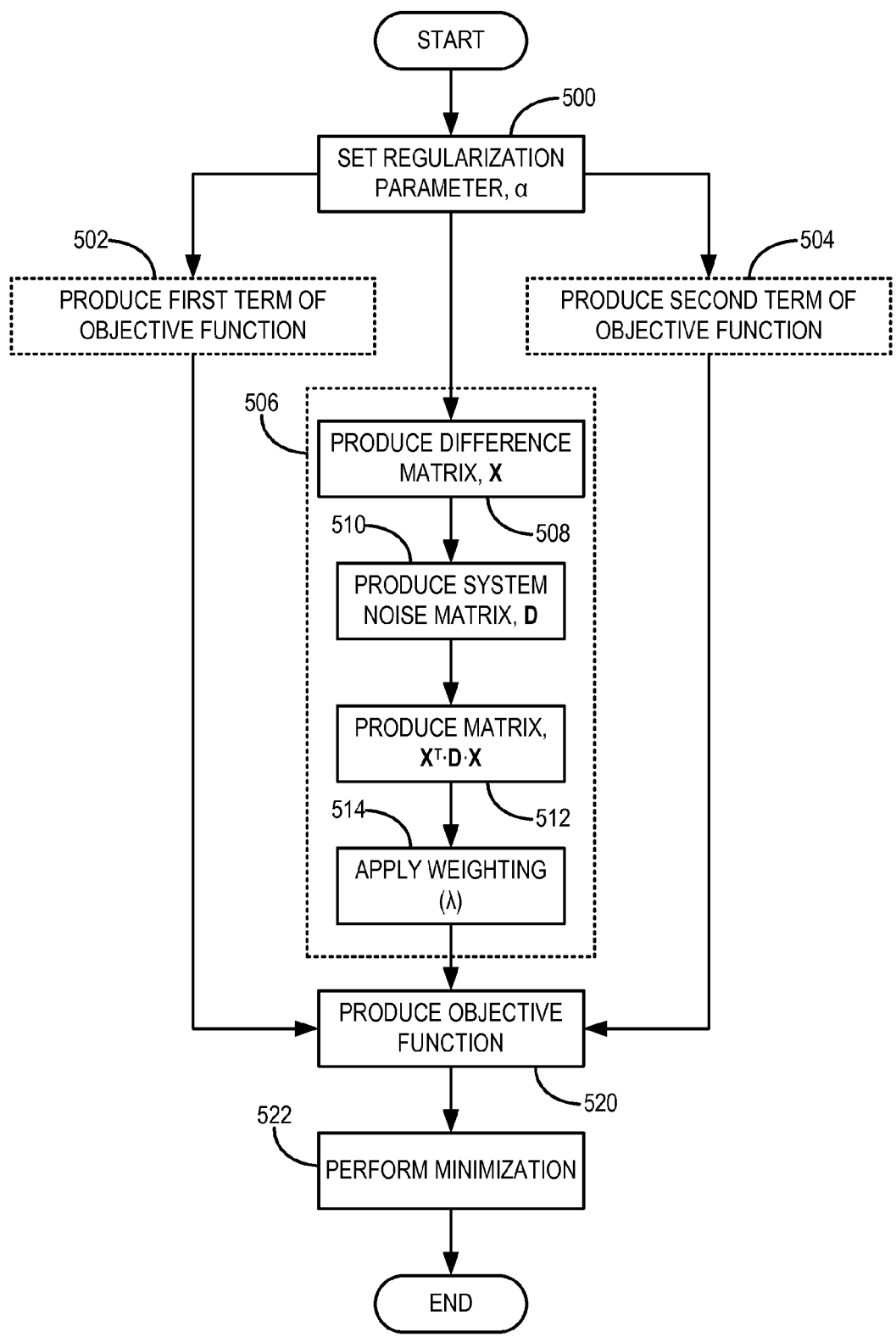
FIG. 5 is a flowchart of yet another embodiment of the image reconstruction method of the present invention.

With reference now to FIG. 5, yet another implementation of the method of the present invention employs the objective function of equation (4), and begins by initializing the regularization parameter, $\alpha$, as indicated at step 500. Subsequently, the first and second terms in the objective function of equation (4) are initialized, as indicated in steps 502 and 504, respectively. This process proceeds in the same manner as described above with reference to steps 302 and 304 in FIG. 3. Now, however, the consistency condition of equation (1) and the effects of noise in the imaging system are incorporated into a third term, $\lambda(X^T D X)$, which is initialized at step 506. First, the difference matrix, X, is produced, as indicated at step 508, and described above with reference to step 408 in FIG. 4. Next, a system noise matrix, D, is produced, as indicated in step 510. The system noise matrix, D, is a diagonal matrix having matrix elements determined in accordance with the following:

$$D_{ij} = \begin{cases} \dfrac{1}{\sigma_n} & \text{if } i = j \\ 0 & \text{if } i \neq j. \end{cases}$$

As described above, $\sigma_n$ is a noise parameter indicative of noise in the imaging system employed when practicing the present invention. For example, in an x-ray imaging system, the noise parameter, $\sigma_n$, is the noise associated with the $n^{th}$ x-ray detector. After the system noise matrix, D, has been produced, the following matrix multiplication is performed:

$$X^T DX,$$

as indicated at step 512. The result of this operation is subsequently scaled by the Lagrange multiplier, as indicated at step 514. The objective function of equation (4) is subsequently produced in step 520 by adding the first, second, and third terms together. This objective function is then minimized, as indicated at step 522, using, for example, a nonlinear conjugate gradient method. The minimization process proceeds until a stopping criterion is satisfied, as described above.

Therefore, in general, the method of the present invention produces an objective function using a prior image of the subject, $I_P$, and the estimate image. This objective function is subsequently minimized using an iterative minimization method to reconstruct the desired image, I. The objective function is produced, for example, by adding together two objective function terms. In equation (2), the first objective function term is produced by applying a sparsifying transform to the difference between the estimate image and the prior image, $I_P$. This difference between the estimate image and prior image is referred to herein as the "sparsified image". The second objective function term is similarly produced by applying a sparsifying transform to the estimate image. The $L_p$-norm of each objective function term is then calculated and the results weighted using the regularization parameter, $\alpha$. Additional terms are alternatively added to the objective function, as discussed above and shown in equations (3) and (4).

The present invention, as described above, may be applied to many different medical imaging modalities and may be utilized in many different clinical applications. A number of such exemplary clinical applications are described below to illustrate the broad scope of the present invention. Such embodiments do not necessarily represent the full scope of the invention, however, and reference is made therefore to the claims and herein for interpreting the scope of the invention.

X-Ray Computed Tomography Imaging System

Figure 6A:
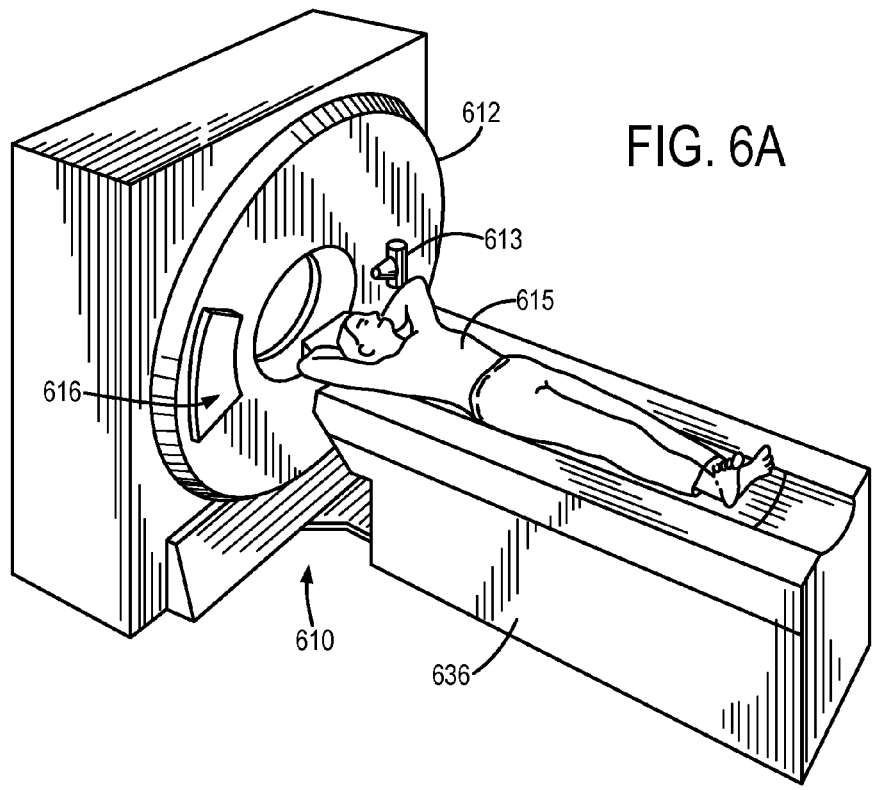
FIG. 6A is a pictorial view of an x-ray computed tomography (CT) imaging system.
Figure 6B:
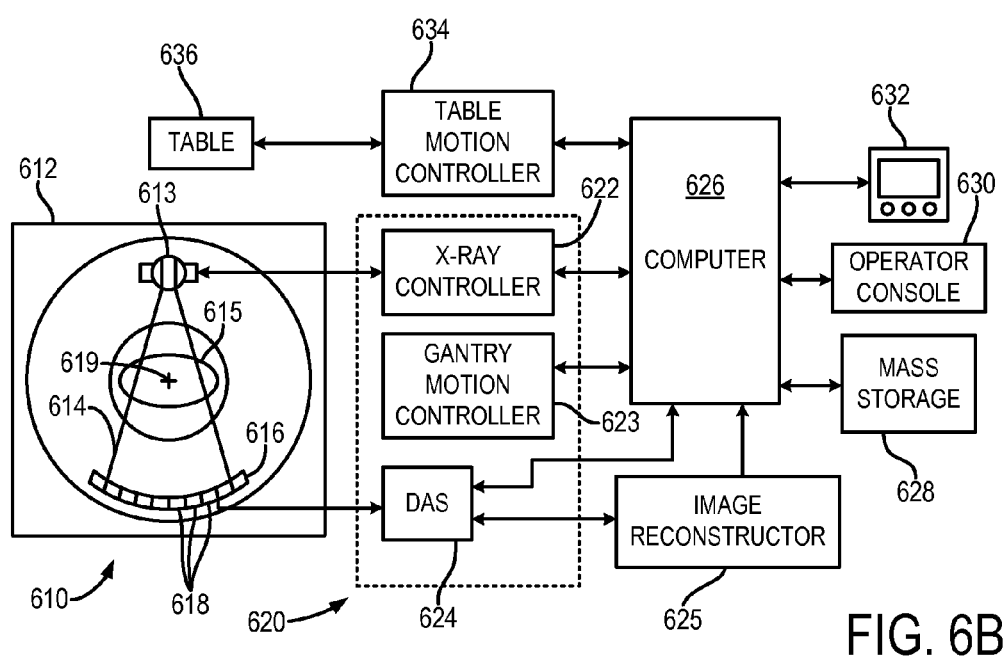
FIG. 6B is a block diagram of the CT imaging system of FIG. 6A.

With initial reference to FIGS. 6A and 6B, an x-ray computed tomography (CT) imaging system 610 includes a gantry 612 representative of a "third generation" CT scanner. Gantry 612 has an x-ray source 613 that projects a fan beam, or cone beam, of x-rays 614 toward a detector array 616 on the opposite side of the gantry. The detector array 616 is formed by a number of detector elements 618 which together sense the projected x-rays that pass through a medical patient 615. Each detector element 618 produces an electrical signal that represents the intensity of an impinging x-ray beam and hence the attenuation of the beam as it passes through the patient. During a scan to acquire x-ray projection data, the gantry 612 and the components mounted thereon rotate about a center of rotation 619 located within the patient 615.

The rotation of the gantry and the operation of the x-ray source 613 are governed by a control mechanism 620 of the CT system. The control mechanism 620 includes an x-ray controller 622 that provides power and timing signals to the x-ray source 613 and a gantry motor controller 623 that controls the rotational speed and position of the gantry 612. A data acquisition system (DAS) 624 in the control mechanism 620 samples analog data from detector elements 618 and converts the data to digital signals for subsequent processing. An image reconstructor 625, receives sampled and digitized x-ray data from the DAS 624 and performs high speed image reconstruction. The reconstructed image is applied as an input to a computer 626 which stores the image in a mass storage device 628.

The computer 626 also receives commands and scanning parameters from an operator via console 630 that has a keyboard. An associated display 632 allows the operator to observe the reconstructed image and other data from the computer 626. The operator supplied commands and parameters are used by the computer 626 to provide control signals and information to the DAS 624, the x-ray controller 622 and the gantry motor controller 623. In addition, computer 626 operates a table motor controller 634 which controls a motorized table 636 to position the patient 615 in the gantry 612.

X-ray Computed Tomography Image Reconstruction

Figure 7:
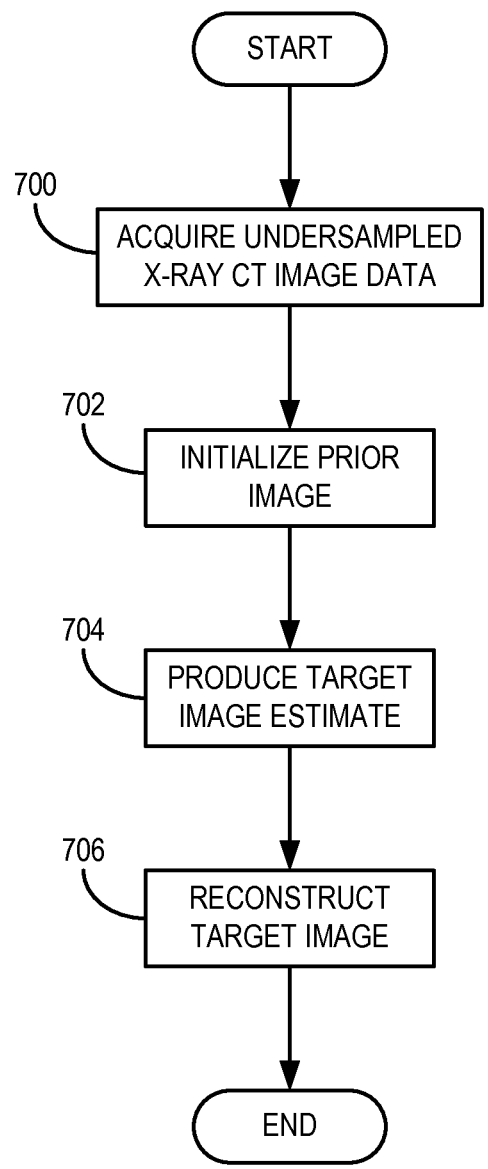
FIG. 7 is a flowchart of an embodiment of the present invention used in the CT system of FIG. 6A.

Referring particularly to FIG. 7, when practiced in an x-ray CT imaging system, such as the one described above, the method of the present invention begins by acquiring undersampled image data with said x-ray CT imaging system, as indicated at step 700. As noted above, image data acquired with an x-ray CT imaging system is in the form of x-ray projection data. The undersampling of the image data can occur for a number of reasons. For example, a sampling pattern that intentionally acquires fewer projection views than necessary to satisfy the Nyquist criterion can be selected by the user. Additionally, the undersampling may be the result of a constraint on the CT imaging system, such as a limit in the gantry rotation speed. After the undersampled image data has been acquired, the prior image is initialized, as indicated at step 702. More specifically, an image is selected as the prior image to be utilized in the reconstruction of the desired image. As discussed above, the prior image may be, for example, the non-contrast enhanced image acquired prior to the administration of a contrast agent to a subject during a CT angiography exam. After the prior image has been selected, a first estimate of the desired image is produced, as indicated at step 704. The first estimate of the desired image can be produced in a number of ways. For example, the undersampled image data corresponding to the desired image can be reconstructed with normal image reconstruction methods, such as filtered backprojection methods. This will produce a poor quality version of the desired image that includes aliasing or streak artifacts. In the alternative, the prior image may be selected as the first estimate of the desired image. Subsequently at step 706, the desired image is reconstructed in accordance with the method of the present invention described above with reference to FIGS. 3, 4, and 5.

C-Arm X-ray Imaging System

Figure 8A:
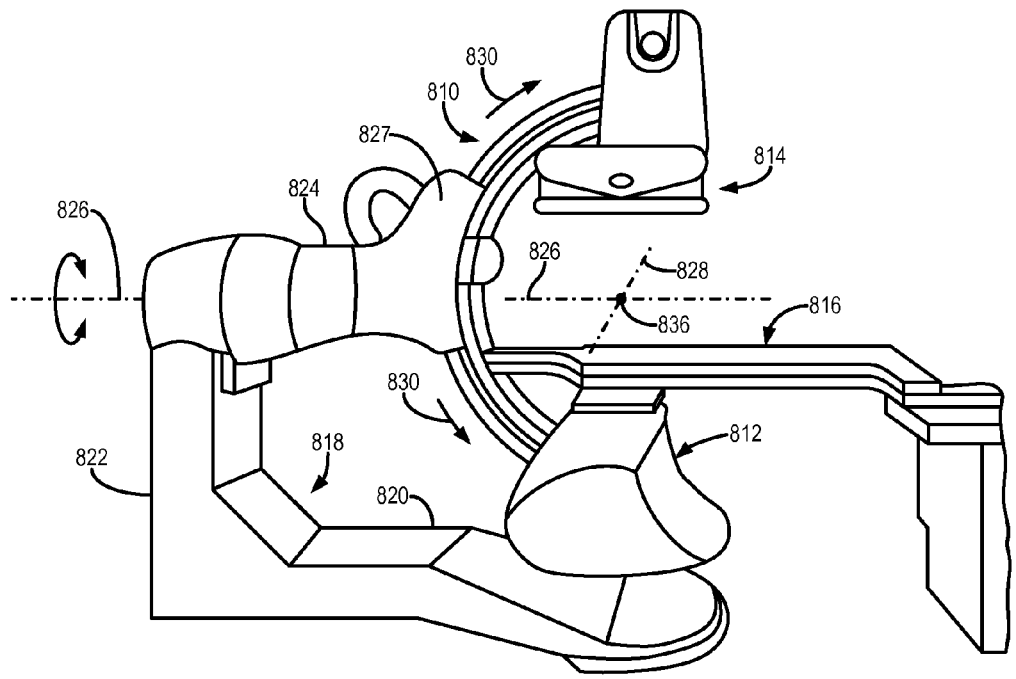
FIG. 8A is a pictorial view of a C-arm x-ray system which employs the present invention.
Figure 8B:
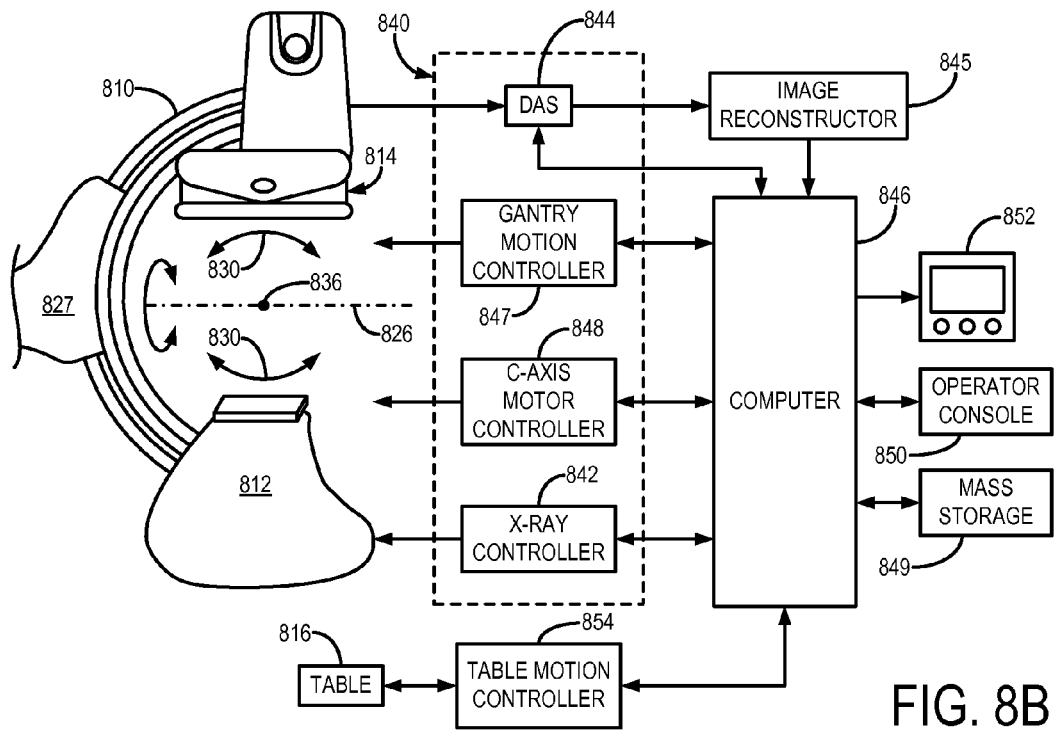
FIG. 8B is a block diagram of the C-arm x-ray system of FIG. 8A.

Referring particularly to FIGS. 8A and 8B, an embodiment of the invention employed to reconstruct images employs an x-ray system that is designed for use in connection with interventional procedures. It is characterized by a gantry having a C-arm 810 which carries an x-ray source assembly 812 on one of its ends and an x-ray detector array assembly 814 at its other end. The gantry enables the x-ray source 812 and detector 814 to be oriented in different positions and angles around a patient disposed on a table 816, while enabling a physician access to the patient.

The gantry includes an L-shaped pedestal 818 which has a horizontal leg 820 that extends beneath the table 816 and a vertical leg 822 that extends upward at the end of the horizontal leg 820 that is spaced from of the table 816. A support arm 824 is rotatably fastened to the upper end of vertical leg 822 for rotation about a horizontal pivot axis 826. The pivot axis 826 is aligned with the centerline of the table 816 and the arm 824 extends radially outward from the pivot axis 826 to support a C-arm drive assembly 827 on its outer end. The C-arm 810 is slidably fastened to the drive assembly 827 and is coupled to a drive motor (not shown) which slides the C-arm 810 to revolve it about a C-axis 828 as indicated by arrows 830. The pivot axis 826 and C-axis 828 intersect each other at an isocenter 836 located above the table 816 and they are perpendicular to each other.

The x-ray source assembly 812 is mounted to one end of the C-arm 810 and the detector array assembly 814 is mounted to its other end. As will be discussed in more detail below, the x-ray source 812 emits a cone beam of x-rays which are directed at the detector array 814. Both assemblies 812 and 814 extend radially inward to the pivot axis 826 such that the center ray of this cone beam passes through the system isocenter 836. The center ray of the cone beam can thus be rotated about the system isocenter around either the pivot axis 826 or the C-axis 828, or both during the acquisition of x-ray attenuation data from a subject placed on the table 816.

Figure 8C:
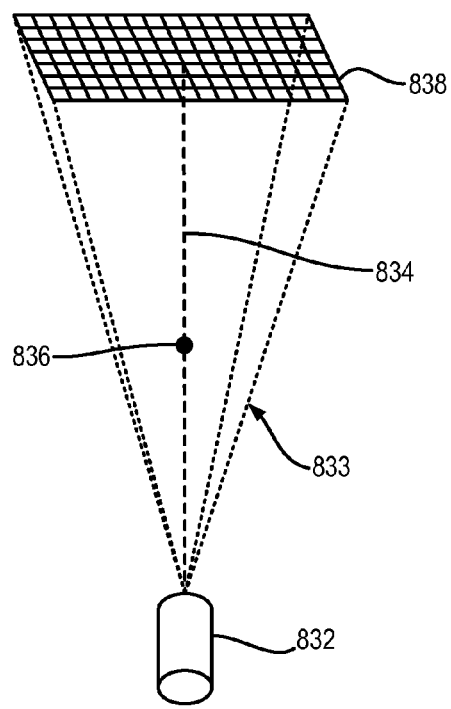
FIG. 8C is a pictorial view of the x-ray source and detector in the C-arm x-ray system of FIG. 8A.

As shown in FIG. 8C, the x-ray source assembly 812 contains an x-ray source 832 which emits a cone beam 833 of x-rays when energized. The center ray 834 passes through the system isocenter 836 and impinges on a two-dimensional flat panel digital detector 838 housed in the detector assembly 814. The detector 838 is a 2048 by 2048 element two-dimensional array of detector elements having a size of 41 cm by 41 cm. Each element produces an electrical signal that represents the intensity of an impinging x-ray and hence the attenuation of the x-ray as it passes through the patient. During a scan the x-ray source 832 and detector array 838 are rotated about the system isocenter 836 to acquire x-ray attenuation projection data from different angles. The detector array is able to acquire 30 projections, or views, per second and this is the limiting factor that determines how many views can be acquired for a prescribed scan path and speed.

Referring particularly to FIG. 8B, the rotation of the assemblies 812 and 814 and the operation of the x-ray source 832 are governed by a control mechanism 840 of the CT system. The control mechanism 840 includes an x-ray controller 842 that provides power and timing signals to the x-ray source 832. A data acquisition system (DAS) 844 in the control mechanism 840 samples data from detector elements 838 and passes the data to an image reconstructor 845. The image reconstructor 845, receives digitized x-ray data from the DAS 844 and performs high speed image reconstruction according to the methods of the present invention. The reconstructed image is applied as an input to a computer 846 which stores the image in a mass storage device 849 or processes the image further.

The control mechanism 840 also includes pivot motor controller 847 and a C-axis motor controller 848. In response to motion commands from the computer 846 the motor controllers 847 and 848 provide power to motors in the x-ray system that produce the rotations about respective pivot axis 826 and C-axis 828. A program executed by the computer 846 generates motion commands to the motor drives 847 and 848 to move the assemblies 812 and 814 in a prescribed scan path.

The computer 846 also receives commands and scanning parameters from an operator via console 850 that has a keyboard and other manually operable controls. An associated cathode ray tube display 852 allows the operator to observe the reconstructed image and other data from the computer 846. The operator supplied commands are used by the computer 846 under the direction of stored programs to provide control signals and information to the DAS 844, the x-ray controller 842 and the motor controllers 847 and 848. In addition, computer 846 operates a table motor controller 854 which controls the motorized table 816 to position the patient with respect to the system isocenter 836.

Figure 8D:
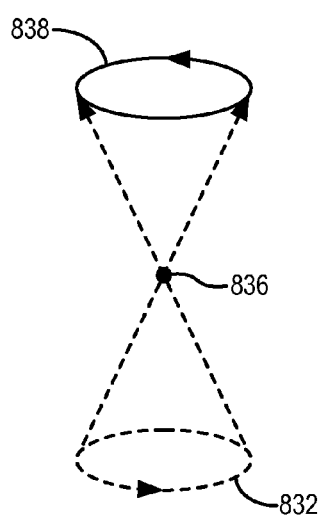
FIG. 8D is a pictorial view of the C-arm scan path employed by the C-arm x-ray system of FIG. 8A.

As shown in FIG. 8D, this scan path is performed by simultaneously operating the pivot axis motor controller 847 and C-axis motor controller 848 to move the x-ray source 832 in a circular or elliptical orbit below the isocenter 836 and the detector 838 in a corresponding circular orbit above the isocenter 836. The size of the circular orbit is determined by a number of factors, but the objective is to make the enclosed area of the path as large as possible. The constraining factor is that the gantry should move through the entire circular path to acquire a single tomosynthesis data set at the frame rate needed to capture the dynamic changes that occur during the inflow of contrast agent. In this embodiment of the invention up to 10 image data sets are acquired in this manner.

C-Arm X-Ray Image Reconstruction

Figure 9:
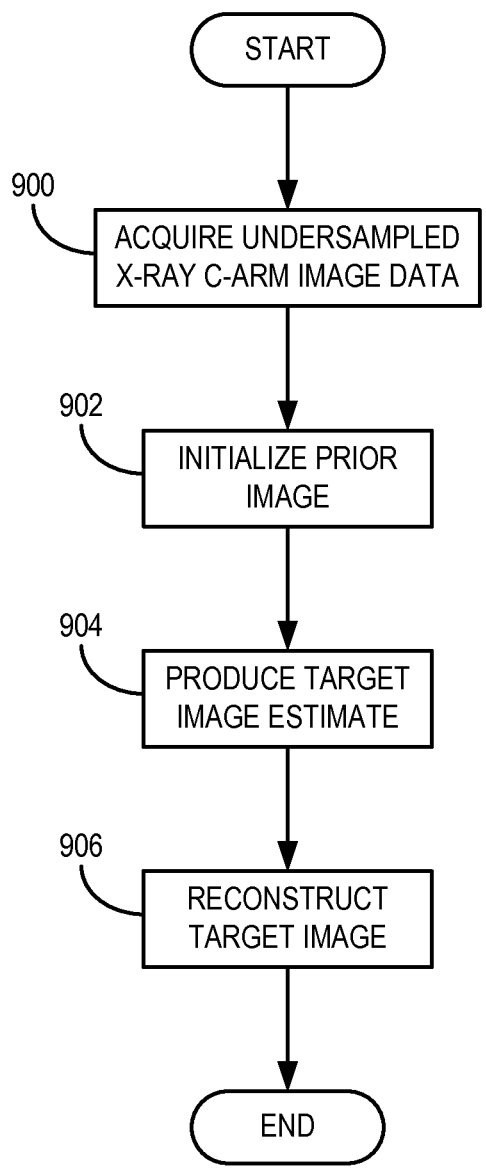
FIG. 9 is a flowchart of another embodiment of the present invention in a scan performed by the C-arm x-ray imaging system of FIG. 8A.

Referring particularly to FIG. 9, when practiced in an x-ray C-arm imaging system, such as the one described above in FIGS. 8A and 8B, the method of the present invention begins by acquiring undersampled image data with said x-ray C-arm imaging system, as indicated at step 900. Similar to the exemplary x-ray CT imaging system described above, an x-ray C-arm imaging system acquires image data in the form of x-ray projection data. During data acquisition, the x-ray source 832 and detector array 838 are continuously moved in the circular paths as shown in FIG. 8D and views are continuously acquired. At the completion of each circular scan the acquired views are saved as an undersampled image data set. After the undersampled image data has been acquired, the prior image is initialized, as indicated at step 902. More specifically, an image is selected as the prior image to be utilized in the reconstruction of the desired image. As discussed above, the prior image may be, for example, a non-contrast enhanced "reference" image acquired prior to the administration of a contrast agent to the subject. For such a reference image, each acquired view in the corresponding reference image data set is a radiograph acquired at a specific point on the circular scan path. The reference image is reconstructed by superimposing these radiograph views and translating them with respect to each other. The location of the 2D image plane is determined by the degree of translation and the reference image can thus be selectively located above or below the system isocenter 836.

After the prior image has been selected, a first estimate of the desired image is produced, as indicated at step 904. The first estimate of the desired image can be produced in a number of ways. For example, the undersampled image data corresponding to the desired image can be reconstructed with normal tomosynthesis image reconstruction methods, such as the method described, for example, in U.S. Pat. No. 4,903,204. This will produce a poor quality version of the desired image that includes aliasing or streak artifacts; however, such an image can suffice for the first estimate of the desired image. In the alternative, the prior image may be selected as the first estimate of the desired image. Subsequently at step 906, the desired image is reconstructed in accordance with the method of the present invention described above with reference to FIGS. 3, 4, and 5.

Magnetic Resonance Imaging System

Figure 10:
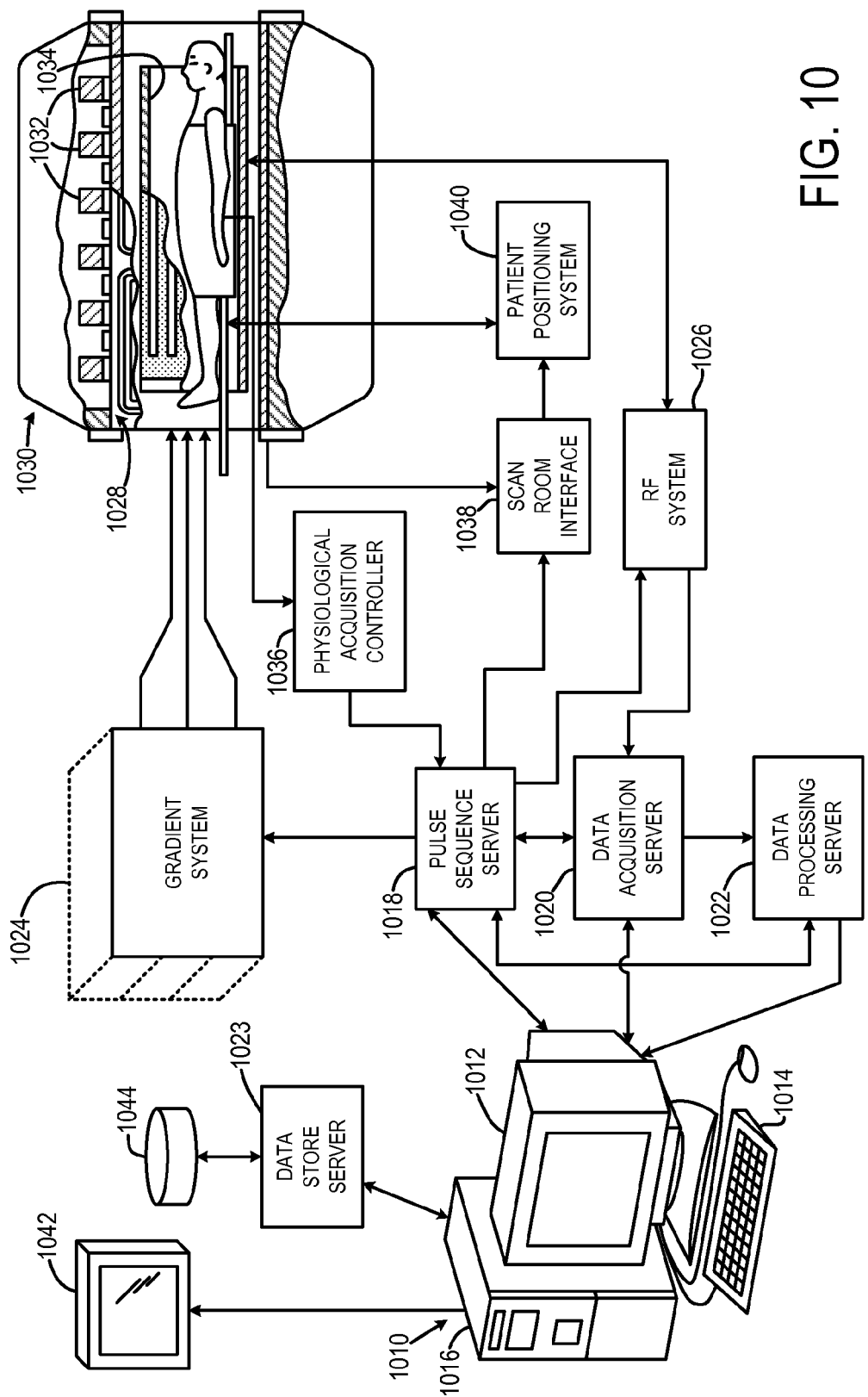
FIG. 10 is a block diagram of a magnetic resonance imaging (MRI) system used to practice the present invention.

The present invention is also particularly applicable to other medical imaging modalities. One such imaging modality is magnetic resonance imaging (MRI). Referring particularly to FIG. 10, the method of the present invention can be employed in an MRI system. The MRI system includes a workstation 1010 having a display 1012 and a keyboard 1014. The workstation 1010 includes a processor 1016 that is a commercially available programmable machine running a commercially available operating system. The workstation 1010 provides the operator interface that enables scan prescriptions to be entered into the MRI system. The workstation 1010 is coupled to four servers: a pulse sequence server 1018; a data acquisition server 1020; a data processing server 1022, and a data store server 1023. The workstation 1010 and each server 1018, 1020, 1022 and 1023 are connected to communicate with each other.

The pulse sequence server 1018 functions in response to instructions downloaded from the workstation 1010 to operate a gradient system 1024 and an RF system 1026. Gradient waveforms necessary to perform the prescribed scan are produced and applied to the gradient system 1024 that excites gradient coils in an assembly 1028 to produce the magnetic field gradients $G_x$, $G_y$, and $G_z$ used for position encoding MR signals. The gradient coil assembly 1028 forms part of a magnet assembly 1030 that includes a polarizing magnet 1032 and a whole-body RF coil 1034.

RF excitation waveforms are applied to the RF coil 1034 by the RF system 1026 to perform the prescribed magnetic resonance pulse sequence. Responsive MR signals detected by the RF coil 1034 or a separate local coil (not shown in FIG. 10) are received by the RF system 1026, amplified, demodulated, filtered and digitized under direction of commands produced by the pulse sequence server 1018. The RF system 1026 includes an RF transmitter for producing a wide variety of RF pulses used in MR pulse sequences. The RF transmitter is responsive to the scan prescription and direction from the pulse sequence server 1018 to produce RF pulses of the desired frequency, phase and pulse amplitude waveform. The generated RF pulses may be applied to the whole body RF coil 1034 or to one or more local coils or coil arrays (not shown in FIG. 10).

The RF system 1026 also includes one or more RF receiver channels. Each RF receiver channel includes an RF amplifier that amplifies the MR signal received by the coil to which it is connected and a detector that detects and digitizes the I and Q quadrature components of the received MR signal. The magnitude of the received MR signal may thus be determined at any sampled point by the square root of the sum of the squares of the I and Q components:

$$M=\sqrt{I^2+Q^2},$$

and the phase of the received MR signal may also be determined:

$$\phi = \tan^{-1}\left(\frac{Q}{I}\right).$$

The pulse sequence server 1018 also optionally receives patient data from a physiological acquisition controller 1036. The controller 1036 receives signals from a number of different sensors connected to the patient, such as ECG signals from electrodes or respiratory signals from a bellows. Such signals are typically used by the pulse sequence server 1018 to synchronize, or "gate", the performance of the scan with the subject's respiration or heart beat.

The pulse sequence server 1018 also connects to a scan room interface circuit 1038 that receives signals from various sensors associated with the condition of the patient and the magnet system. It is also through the scan room interface circuit 1038 that a patient positioning system 1040 receives commands to move the patient to desired positions during the scan.

The digitized MR signal samples produced by the RF system 1026 are received by the data acquisition server 1020. The data acquisition server 1020 operates in response to instructions downloaded from the workstation 1010 to receive the real-time MR data and provide buffer storage such that no data is lost by data overrun. In some scans the data acquisition server 1020 does little more than pass the acquired MR data to the data processor server 1022. However, in scans that require information derived from acquired MR data to control the further performance of the scan, the data acquisition server 1020 is programmed to produce such information and convey it to the pulse sequence server 1018. For example, during prescans MR data is acquired and used to calibrate the pulse sequence performed by the pulse sequence server 1018. Also, navigator signals may be acquired during a scan and used to adjust RF or gradient system operating parameters or to control the view order in which k-space is sampled. And, the data acquisition server 1020 may be employed to process MR signals used to detect the arrival of contrast agent in an MRA scan. In all these examples the data acquisition server 1020 acquires MR data and processes it in real-time to produce information that is used to control the scan.

The data processing server 1022 receives MR data from the data acquisition server 1020 and processes it in accordance with instructions downloaded from the workstation 1010. Such processing may include, for example: Fourier transformation of raw k-space MR data to produce two or three-dimensional images; the application of filters to a reconstructed image; the performance of a backprojection image reconstruction of acquired MR data; the calculation of functional MR images; the calculation of motion or flow images, etc.

Images reconstructed by the data processing server 1022 are conveyed back to the workstation 1010 where they are stored. Real-time images are stored in a data base memory cache (not shown) from which they may be output to operator display 1012 or a display 1042 that is located near the magnet assembly 1030 for use by attending physicians. Batch mode images or selected real time images are stored in a host database on disc storage 1044. When such images have been reconstructed and transferred to storage, the data processing server 1022 notifies the data store server 1023 on the workstation 1010. The workstation 1010 may be used by an operator to archive the images, produce films, or send the images via a network to other facilities.

Like the CT system, the MRI system has many different clinical applications in which either 2D or 3D sets of projection views are acquired and used to reconstruct one or more images of the patient. Whereas the projection views acquired by the CT system include Radon space samples, the projection views acquired by the MRI system include k-space (or Fourier space) samples. Image reconstruction using data acquired with an MRI system necessarily requires transformation from k-space to real space, or as an intermediate step, into Radon space.

Exemplary Magnetic Resonance Imaging Pulse Sequence

Figure 11:
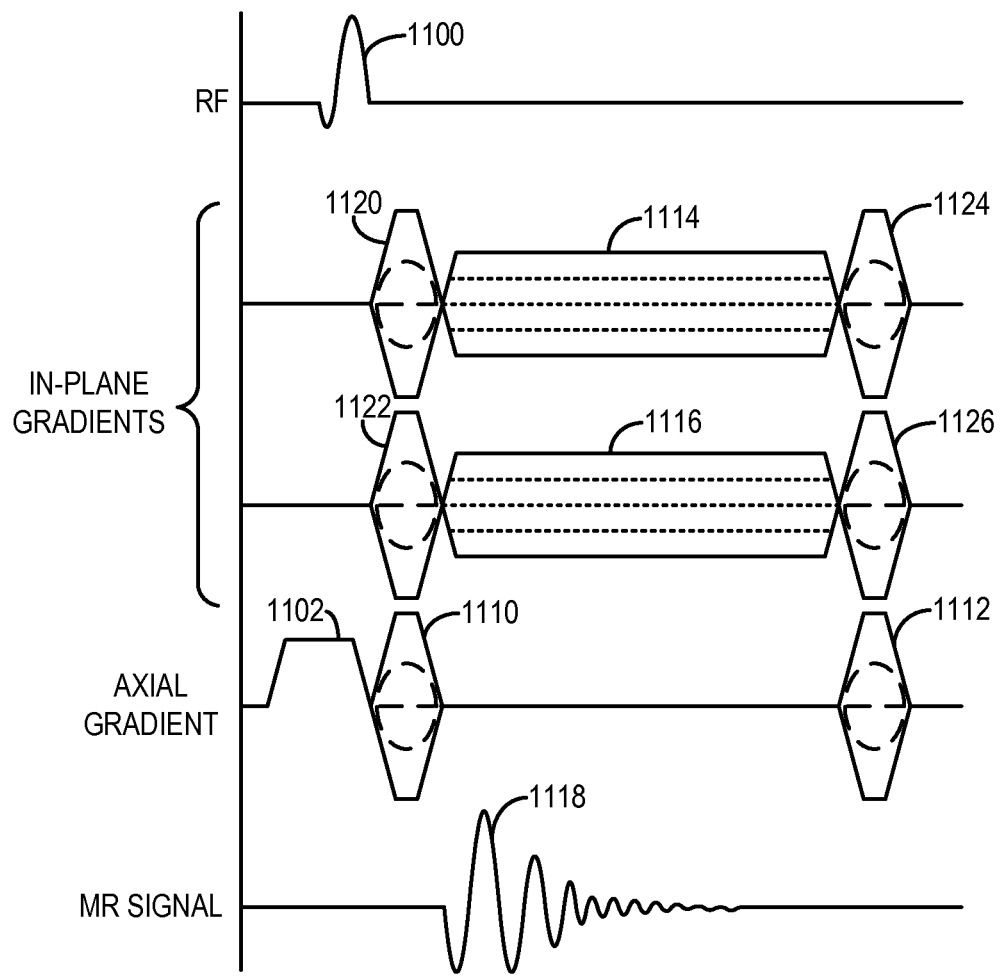
FIG. 11 is a pulse sequence used in the MRI system of FIG. 10 to practice one embodiment of the invention.
Figure 12:
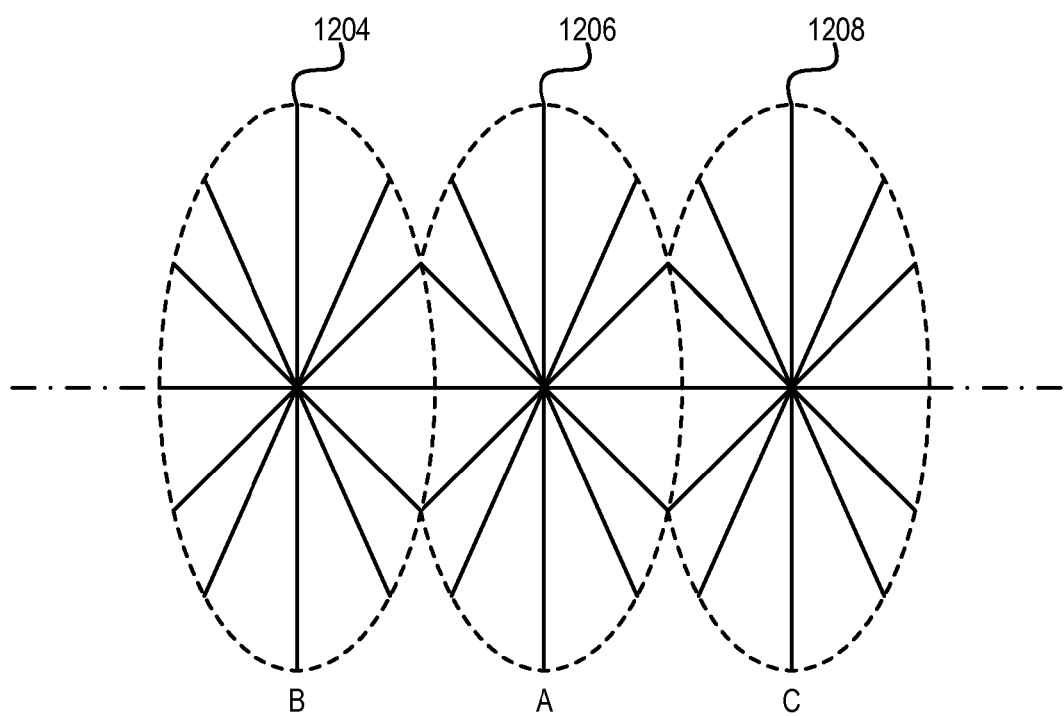
FIG. 12 is a pictorial representation of the k-space data sampled using the pulse sequence of FIG. 11.

To practice the present invention using an MR imaging system, such as the one described above with reference to FIG. 10, undersampled image data is acquired using a projection reconstruction, or radial, pulse sequence such as that shown in FIG. 11. This is a fast gradient-recalled echo pulse sequence in which a selective, asymmetrically truncated sinc RF excitation pulse 1100 is produced in the presence of a slice-select gradient 1102. This pulse sequence may be used to acquire a single 2D slice by sampling in a single k-space circular plane, or it may be used to sample a plurality of circular k-space planes as shown at 1204, 1206, and 1208 in FIG. 12. When multiple 2D slices are acquired the gradient 1102 is a slab select gradient followed by a phase encoding gradient lobe 1110 and a rewinder gradient lobe 1112 of opposite polarity. This axial, phase encoding gradient 1110 is stepped through values during the scan to sample from each of the 2D k-space planes 1204, 1206, and 1208.

Two in-plane readout gradients 1114 and 1116 are played out during the acquisition of an NMR echo signal 1118 to sample k-space in a 2D plane 1204, 1206, or 1208 along a radial trajectory. These in-plane gradients 1114 and 1116 are perpendicular to the axial gradient and they are perpendicular to each other. During a scan they are stepped through a series of values to rotate the view angle of the radial sampling trajectory as will be described in more detail below. Each of the in-plane readout gradients is preceded by a prephasing gradient lobe 1120 and 1122 and followed by a rewinder gradient lobe 1124 and 1126.

It should be apparent to those skilled in the art that sampling trajectories other than the preferred straight line trajectory extending from one point on the k-space peripheral boundary, through the center of k-space to an opposite point on the k-space peripheral boundary may also be used. As mentioned above, one variation is to acquire a partial NMR echo signal 1103 that samples along a trajectory that does not extend across the entire extent of the sampled k-space volume. Another variation which is equivalent to the straight line projection reconstruction pulse sequence is to sample along a curved path rather than a straight line. Such pulse sequences are described, for example, by F. E. Boada, et al., in "Fast Three Dimensional Sodium Imaging", *Magnetic Resonance in Medicine*, 1997; 37:706-715, by K. V. Koladia, et al., in "Rapid 3D PC-MRA Using Spiral Projection Imaging", *Proc. Intl. Soc. Magn. Reson. Med.* 13 (2005), and by J. G. Pipe and K. V. Koladia in "Spiral Projection Imaging: a new fast 3D trajectory", *Proc. Intl. Soc. Mag. Reson. Med.* 13 (2005). It should also be apparent that the present invention may be employed with 3D as well as 2D versions of these sampling methods and use of the term "pixel" herein is intended to refer to a location in either a 2D or a 3D image. Moreover, the present invention is applicable to reconstructing an image from undersampled image data acquired by employing any number of pulse sequences and sampling patterns, as will be appreciated by those skilled in the art.

The MRI system described above can be used in a wide variety of clinical applications to acquire either 2D or 3D sets of projection views that may be used to reconstruct one or more images. The image reconstruction method of the present invention is particularly useful in scans where one or more image frames are reconstructed using less than all the acquired projection views.

Magnetic Resonance Image Reconstruction

Figure 13:
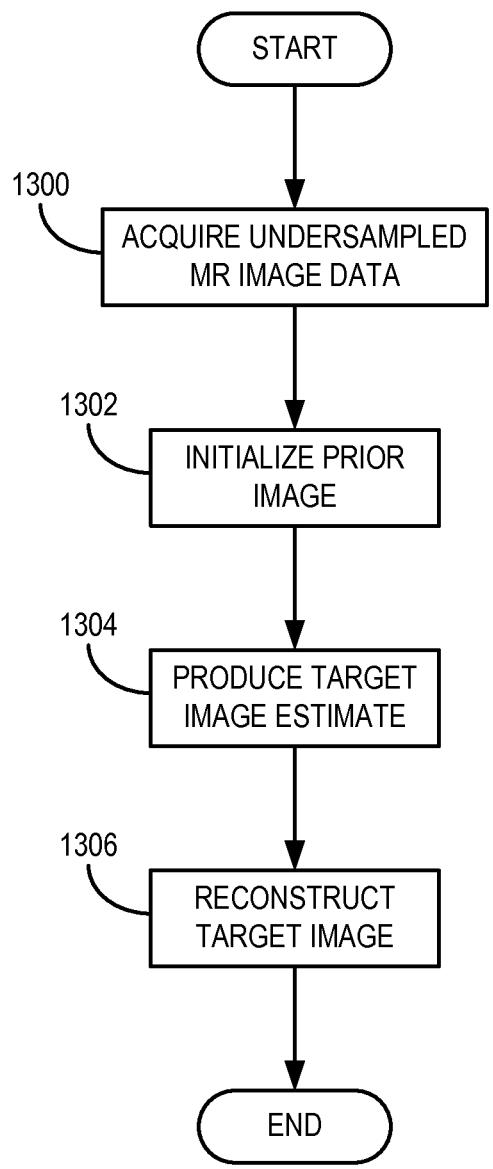
FIG. 13 is a flowchart of yet another embodiment of the invention used in the MRI system of FIG. 10 with the pulse sequence of FIG. 11.

Referring particularly to FIG. 13, when practiced in an MR imaging system, such as the one described above in FIG. 10, the method of the present invention begins by acquiring undersampled image data with said MR imaging system, as indicated at step 1300. As described above, the undersampled image data is acquired by sampling k-space with a series of radial projections. This is achieved using the pulse sequence shown in FIG. 11. In the alternative, k-space can be sampled by employing a pulse sequence that samples k-space in a Cartesian sampling pattern, a spiral sampling pattern, or other patterns that will be appreciated by those skilled in the art. After the undersampled image data has been acquired, the prior image is initialized, as indicated at step 1302. More specifically, an image is selected as the prior image to be utilized in the reconstruction of the desired image. As discussed above, the prior image may be, for example, a non-contrast enhanced image acquired prior to the administration of a contrast agent to the subject. In addition, the prior image may be a high resolution image obtained in a previous imaging session. When such a higher resolution is employed from a previous scanning session, image registration may be necessary before reconstruction of the desired image. After the prior image has been selected, a first estimate of the desired image is produced, as indicated at step 1304. The first estimate of the desired image can be produced in a number of ways. For example, the undersampled image data corresponding to the desired image can be reconstructed with normal image reconstruction methods. In the alternative, the prior image may be selected as the first estimate of the desired image. Subsequently at step 1306, the desired image is reconstructed in accordance with the method of the present invention described above with reference to FIGS. 3, 4, and 5.

The present invention has been described in terms of one or more preferred embodiments, and it should be appreciated that many equivalents, alternatives, variations, and modifications, aside from those expressly stated, are possible and within the scope of the invention.

The invention claimed is:

1. A method for reconstructing an image of a subject with an imaging system using a prior image of the subject, the steps comprising:
    a) acquiring, with the imaging system, undersampled image data of the subject;
    b) selecting an estimate image of the subject;
    c) producing a sparsified image of the subject by using the prior image of the subject to sparsify the estimate image; and
    d) reconstructing a desired image of the subject using the sparsified image, the estimate image, and the acquired undersampled image data.

2. The method as recited in claim 1 in which step b) includes selecting the prior image as the estimate image.

3. The method as recited in claim 1 in which step b) includes reconstructing the estimate image from the acquired undersampled image data.

4. The method as recited in claim 1 in which step d) is iteratively performed and, after each iteration, the estimate image is updated.

5. The method as recited in claim 1 in which step c) includes subtracting the prior image from the estimate image.

6. The method as recited in claim 1 in which step d) includes:
    d)i) producing an objective function using the sparsified image and the estimate image; and
    d)ii) reconstructing the desired image by iteratively minimizing the objective function.

7. The method as recited in claim 6 in which step d)i) includes:
    producing a first objective function term by applying a sparsifying transform to the sparsified image;

producing a second objective function term by applying a sparsifying transform to the estimate image; and adding the first and second objective function terms.

8. The method as recited in claim 7 in which step d)i) further includes calculating a norm of the first and second objective function terms.

9. The method as recited in claim 7 in which step d)i) further includes weighting the first and second objective function terms with a regularization parameter.

10. The method as recited in claim 6 in which the objective function has the form:

$$\alpha\|\Psi_1 I\|_p + (1-\alpha)\|\Psi_2(I-I_P)\|_p;$$

wherein:
α is a regularization parameter;
$\Psi_1$ is a first sparsifying transform;
$\Psi_2$ is a second sparsifying transform;
I is the estimate image;
$I_P$ is the prior image; and
$\|\ldots\|_p$ is an $L_p$-norm.

11. The method as recited in claim 10 in which the first sparsifying transform is at least one of a wavelet transform, a discrete gradient, a first order finite difference, and a second order finite difference.

12. The method as recited in claim 11 in which the second sparsifying transform is at least one of a wavelet transform, a discrete gradient, a first order finite difference, and a second order finite difference.

13. The method as recited in claim 6 in which the objective function has the form:

$$\alpha\|\Psi_1(I-I_P)\|_p + (1-\alpha)\|\Psi_2 I\|_p + \lambda\|X\|_2^2;$$

wherein:
α is a regularization parameter;
$\Psi_1$ is a first sparsifying transform;
$\Psi_2$ is a second sparsifying transform;
I is the estimate image;
$I_P$ is the prior image;
$\|\ldots\|_p$ is an $L_p$-norm;
λ is a Lagrange multiplier;
X is a difference matrix that describes the difference between the acquired undersampled image data and forward projection of the estimate image; and
$\|\ldots\|_2^2$ is a squared $L_2$-norm.

14. The method as recited in claim 6 in which the objective function has the form:

$$\alpha\|\Psi_1(I-I_P)\|_1 + (1-\alpha)\|\Psi_2 I\|_1 + \lambda(X^T DX);$$

wherein:
α is a regularization parameter;
$\Psi_1$ is a first sparsifying transform;
$\Psi_2$ is a second sparsifying transform;
I is the estimate image;
$I_P$ is the prior image;
$\|\ldots\|_p$ is an $L_p$-norm;
λ is a Lagrange multiplier;
X is a difference matrix that describes the difference between the acquired undersampled image data and forward projection of the estimate image; and
D is a system noise matrix.

15. The method as recited in claim 1 in which the imaging system is at least one of a magnetic resonance imaging (MRI) system, an x-ray computed tomography (CT) imaging system, and a C-arm x-ray imaging system.

16. A method for reconstructing an image of a subject with an imaging system using a prior image of the subject, the steps comprising:

a) acquiring, with the imaging system, undersampled image data of the subject;

b) producing an estimate image of the subject;

c) producing an objective function in which the prior image is used to sparsify the estimate image; and d) reconstructing a desired image using the undersampled image data acquired in step a) and by iteratively minimizing the objective function.

17. The method as recited in claim 16 in which step b) includes selecting the prior image as the estimate image.

18. The method as recited in claim 16 in which step b) includes reconstructing the estimate image from the acquired undersampled image data.

19. The method as recited in claim 16 in which the objective function has the form:

$$\alpha\|\Psi_1 I\|_p + (1-\alpha)\|\Psi_2(I-I_P)\|_p;$$

wherein:
α is a regularization parameter;
$\Psi_1$ is a first sparsifying transform;
$\Psi_2$ is a second sparsifying transform;
I is the estimate image;
$I_P$ is the prior image; and
$\|\ldots\|_p$ is an $L_p$-norm.

20. The method as recited in claim 19 in which the first sparsifying transform is at least one of a wavelet transform, a discrete gradient, a first order finite difference, and a second order finite difference.

21. The method as recited in claim 20 in which the second sparsifying transform is at least one of a wavelet transform, a discrete gradient, a first order finite difference, and a second order finite difference.

22. The method as recited in claim 16 in which the objective function has the form:

$$\alpha\|\Psi_1(I-I_P)\|_p + (1-\alpha)\|\Psi_2 I\|_p + \lambda\|X\|_2^2;$$

wherein:
α is a regularization parameter;
$\Psi_1$ is a first sparsifying transform;
$\Psi_2$ is a second sparsifying transform;
I is the estimate image;
$I_P$ is the prior image;
$\|\ldots\|_p$ is an $L_p$-norm;
λ is a Lagrange multiplier;
X is a difference matrix that describes the difference between the acquired undersampled image data and forward projection of the estimate image; and
$\|\ldots\|_2^2$ is a squared $L_2$-norm.

23. The method as recited in claim 16 in which the objective function has the form:

$$\alpha\|\Psi_1(I-I_P)\|_1 + (1-\alpha)\|\Psi_2 I\|_1 + \lambda(X^T DX);$$

wherein:
α is a regularization parameter;
$\Psi_1$ is a first sparsifying transform;
$\Psi_2$ is a second sparsifying transform;
I is the estimate image;
$I_P$ is the prior image;
$\|\ldots\|_p$ is an $L_p$-norm;
λ is a Lagrange multiplier;
X is a difference matrix that describes the difference between the acquired undersampled image data and forward projection of the estimate image; and
D is a system noise matrix.

24. The method as recited in claim 16 in which the imaging system is at least one of a magnetic resonance imaging (MRI) system, an x-ray computed tomography (CT) imaging system, and a C-arm x-ray imaging system.

* * * * *